(12) United States Patent
Grandominico et al.

(10) Patent No.: US 10,196,099 B2
(45) Date of Patent: Feb. 5, 2019

(54) AERODYNAMIC SKIRT ASSEMBLY

(71) Applicants: Gary Alan Grandominico, Galena, OH (US); Dominic Plauche Grandominico, Columbus, OH (US); Raymond Augustus McDonald, Jr., Pooler, GA (US); Bret Jameson Moss, Lewis Center, OH (US)

(72) Inventors: Gary Alan Grandominico, Galena, OH (US); Dominic Plauche Grandominico, Columbus, OH (US); Raymond Augustus McDonald, Jr., Pooler, GA (US); Bret Jameson Moss, Lewis Center, OH (US)

(73) Assignee: Ridge Corporation, Pataskala, OH (US)

(*) Notice: Subject to any disclaimer, the term of this patent is extended or adjusted under 35 U.S.C. 154(b) by 0 days.

(21) Appl. No.: 15/403,795

(22) Filed: Jan. 11, 2017

(65) Prior Publication Data
US 2017/0120965 A1 May 4, 2017

Related U.S. Application Data

(63) Continuation of application No. 14/656,231, filed on Mar. 12, 2015, now Pat. No. 9,573,636, which is a (Continued)

(51) Int. Cl.
*B62D 35/00* (2006.01)
*B62D 25/16* (2006.01)
(Continued)

(52) U.S. Cl.
CPC ........ *B62D 35/001* (2013.01); *B62D 25/168* (2013.01); *B62D 35/008* (2013.01);
(Continued)

(58) Field of Classification Search
CPC ............................ B62D 35/001; B62D 35/008
(Continued)

(56) References Cited

U.S. PATENT DOCUMENTS

| 7,942,468 B2 * | 5/2011 | Boivin | B62D 35/001 180/903 |
| 8,191,956 B1 * | 6/2012 | Dixon, Jr. | B62D 35/001 296/180.1 |

(Continued)

*Primary Examiner* — Jason S Morrow
(74) *Attorney, Agent, or Firm* — Walter Haverfield LLP; James J. Pingor

(57) ABSTRACT

A resilient or flexible skirt panel assembly having an integral bracing system. In operation, the bracing system need not attach to a trailer base rail. The innovation discloses straight, straight-angled and curved skirt panel orientations. Additionally, angled braces, "v-braces," "v-wings," and integral rib bracing mechanisms are disclosed. In aspects, the skirt panel and bracing mechanisms can absorb (or bend) under force while effectively having a "memory" to return to their original shape upon removal of the force. The skirt assembly can include a hem along the bottom edge of the skirt panel thereby enhancing performance and longevity of the assembly. Additionally, an "anti-skid" clamping assembly can be employed to connect the skirt assemblies to the trailer I-beam, base rail or cross-members.

14 Claims, 30 Drawing Sheets

Related U.S. Application Data continuation of application No. 13/197,425, filed on Aug. 3, 2011, now Pat. No. 9,004,575.

(60) Provisional application No. 61/370,334, filed on Aug. 3, 2010.

(51) Int. Cl.
*B62D 35/02* (2006.01)
*B62D 65/16* (2006.01)
*B62D 37/02* (2006.01)
*F16M 13/02* (2006.01)

(52) U.S. Cl.
CPC ............ *B62D 35/02* (2013.01); *B62D 37/02* (2013.01); *B62D 65/16* (2013.01); *F16M 13/02* (2013.01); *B60Y 2410/122* (2013.01); *Y02T 10/88* (2013.01); *Y10T 29/49826* (2015.01)

(58) Field of Classification Search
USPC ........................................ 296/180.2, 180.4
See application file for complete search history.

(56) References Cited

U.S. PATENT DOCUMENTS

| | | | |
|---|---|---|---|
| 2006/0152038 A1* | 7/2006 | Graham | B60R 19/565 296/180.1 |
| 2009/0189414 A1* | 7/2009 | Boivin | B62D 35/001 296/180.4 |
| 2011/0285167 A1* | 11/2011 | Butler | B62D 35/001 296/180.1 |

* cited by examiner

AERODYNAMIC SKIRT ASSEMBLY

CROSS-REFERENCE TO RELATED APPLICATIONS

This application is a continuation of U.S. application Ser. No. 14/656,231, now U.S. Pat. No. 9,573,636, entitled "AERODYNAMIC SKIRT ASSEMBLY" and filed on Mar. 12, 2015 which is a continuation of U.S. application Ser. No. 13/197,425, now U.S. Pat. No. 9,004,575, entitled "AERODYNAMIC SKIRT ASSEMBLY" and filed on Aug. 3, 2011 which claims the benefit of U.S. Provisional Patent application Ser. No. 61/370,334 entitled "AERODYNAMIC SKIRT ASSEMBLY" and filed Aug. 3, 2010. The entirety of the above-noted applications are incorporated by reference herein.

BACKGROUND

With today's focus on fuel efficiencies, there has been growing emphasis on increasing vehicle and particular truck aerodynamics. In accordance therewith, manufacturers and third-parties have designed and developed a wide variety of aerodynamic solutions that reduce wind drag upon trucks and trailers.

One particular line of products is the trailer skirt. A trailer skirt is essentially a downward extension of the trailer sides, particularly between the landing gear and the rear wheels that prevent accumulation of air beneath the trailer. Thus, aerodynamics and fuel efficiency can be enhanced by directing air down the side of the trailer decreasing air drag on the trailer.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a resilient (or flexible) skirt assembly that can include a v-brace designed support. The v-brace support can be a resilient support (e.g., can deform and return to its original position) that can be mounted exclusively onto the inner wall of the resilient skirt. This brace can provide strength rigidity while permitting flexibility as needed (e.g., in cases of contact with a foreign object).

In another aspect of the subject innovation, a resilient or flexible brace can be provided as an "integral" resilient brace to the resilient skirt panel. In other words, the "integral" brace can be effectively molded into the panel thereby providing strength rigidity as well as flexibility as needed. V-wings and angled braces are also disclosed herein.

In yet other aspects, the skirt panels can be orientated on an angled formation extending straight from the landing gear (or rear tractor duels) toward the rear wheels of the trailer. These skirts can be equipped with a resilient brace such as a v-brace, v-wing, integral brace or angled brace as appropriate. Yet other aspects can employ these various brace designs along with skirt panels that curve inward toward the landing gear or alternatively, straight along the sidewall of the trailer.

In yet other aspects, an anti-skid cross-member clamp (and system thereof) can be employed in accordance with skirt assemblies to as to eliminate or otherwise alleviate motion of the skirt assembly (e.g., due to aerodynamic forces and impact primarily).

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1A:
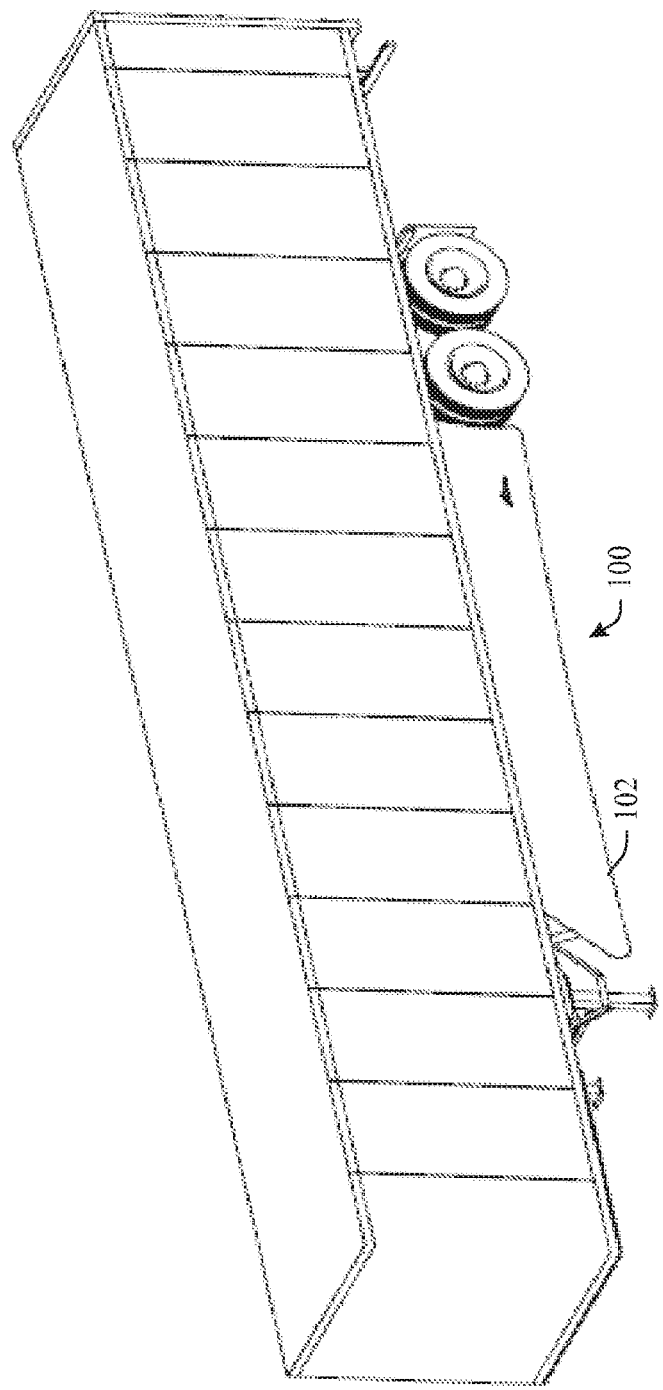
FIG. 1A illustrates an example straight skirt assembly in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

The following specification and drawings are provided to set forth aspects of the innovation and are not intended to limit the innovation in any manner. In other words, while specific combinations of skirt orientations and bracing assemblies are shown, it is to be understood that alternative combinations are contemplated and are to be included within the scope of this specification and claims appended hereto.

The innovation describes a resilient skirt assembly that can be mounted upon a trailer in a variety of configurations. It is to be understood and appreciated that "resilient," as used herein, refers to materials having flexibility or an ability to bend, flex or deform while returning to (or substantially to) an original shape. As illustrated, these skirt configurations include, but are not limited to, straight, straight-angled and curved. While these specific configurations are shown, it is to be understood that, if desired, other configurations can be employed in other aspects, e.g., rear portion flared outward. It will be appreciated that the skirt panels shown and described herein can be manufactured of resilient material capable of flexing or bending if needed. In operation, the resiliency of the material can enable the skirt panel to flex when a force is applied and to regain its original shape once the force has subsided. As used herein, a 'skirt' is to include either a single or multiple panel skirt—all of which are to be included within the scope of this disclosure. For example, a multiple panel design can be top to bottom, front to rear, combinations thereof as well as multiple (e.g., more than two) segments as by design or desired.

In combination with a specific skirt panel orientation, as shown in the figures, a variety of support and/or brace assemblies (e.g., resilient supports and braces) can be employed to provide strength and rigidity to the skirt assembly. These support assemblies can be manufactured from particular materials such that they can flex along with the skirt assembly, e.g., if the skirt should strike a foreign object.

Referring initially to the drawings, FIG. 1A illustrates an example straight skirt assembly 100 mounted beneath a trailer box and arranged parallel to the sidewall(s) of the trailer. While a specific shape of skirt panel 102 is shown, other shapes can be employed (in this example and others described herein) without departing from the spirit and/or scope of this disclosure. For example, the rear portion of the skirt can employ a pronounced rounded cutout with a similar shape as that of the rear trailer wheels. Similarly, if desired, the frontward portion of the skirt can employ a square or rounded profile in other aspects. Further, the forward most portion can be flush with the base rail of the trailer rather than cut away as shown. It will be appreciated that a specific skirt profile and orientation upon a trailer can affect aerodynamic efficiencies. For at least this reason, combinations can be selected for a specific design goal. Each of these alternatives is to be included within the scope of this disclosure and claims appended hereto.

Figure 1B:
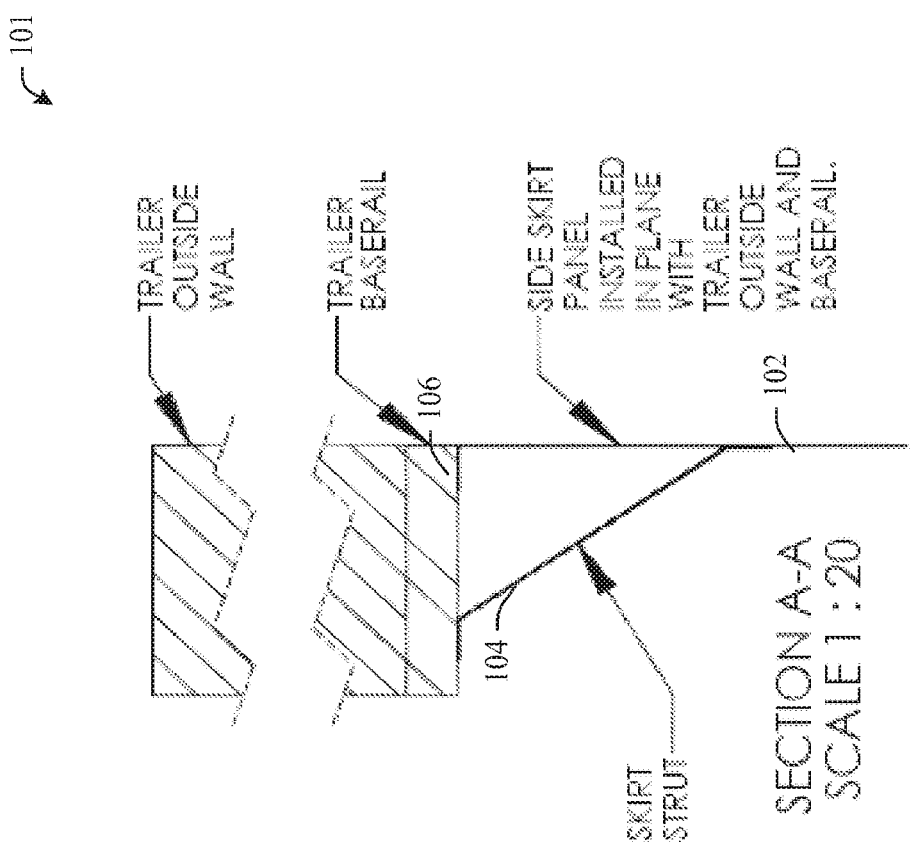
FIG. 1B illustrates an example angled brace in accordance with aspects of the innovation.

Referring now to FIG. 1B, an example angled strut assembly 101 is shown in accordance with aspects of the innovation. As shown, the angled strut 104 can be attached in an area between the trailer base rail and the side skirt panel 102. In one example, the example strut 104 can be configured to attach to mounting brackets (not shown) in order to affix between the skirt and the trailer. In other words, in aspects the strut 104 need not be in direct communication with either or both the skirt and/or trailer undercarriage.

In another aspect, the angled strut 104 can be positioned at an angle less than 45 degrees in relation to the skirt panel 102 such that the angled strut connects between the skirt panel inner face and molded horizontal flange. In this aspect, the flange portion 106 can be extended in a horizontal direction (or elongated toward the centerline of the trailer) as appropriate. In these examples, the strut 104 can be wholly contained within the skirt assembly 102, for example, within a top flange assembly 106. It will be appreciated that in this arrangement, the strut 104 need not be in direct communication with the trailer or base rail. As illustrated, in this example of FIG. 1B, the side skirt 102 is installed in-plane with the trailer outside wall and base rail. In operation, a plurality of struts 104 can be installed along the length of the skirt panel 102 so as to provide rigidity and strength, for example, to withstand or resist wind load when the trailer is in motion.

Figure 1C:
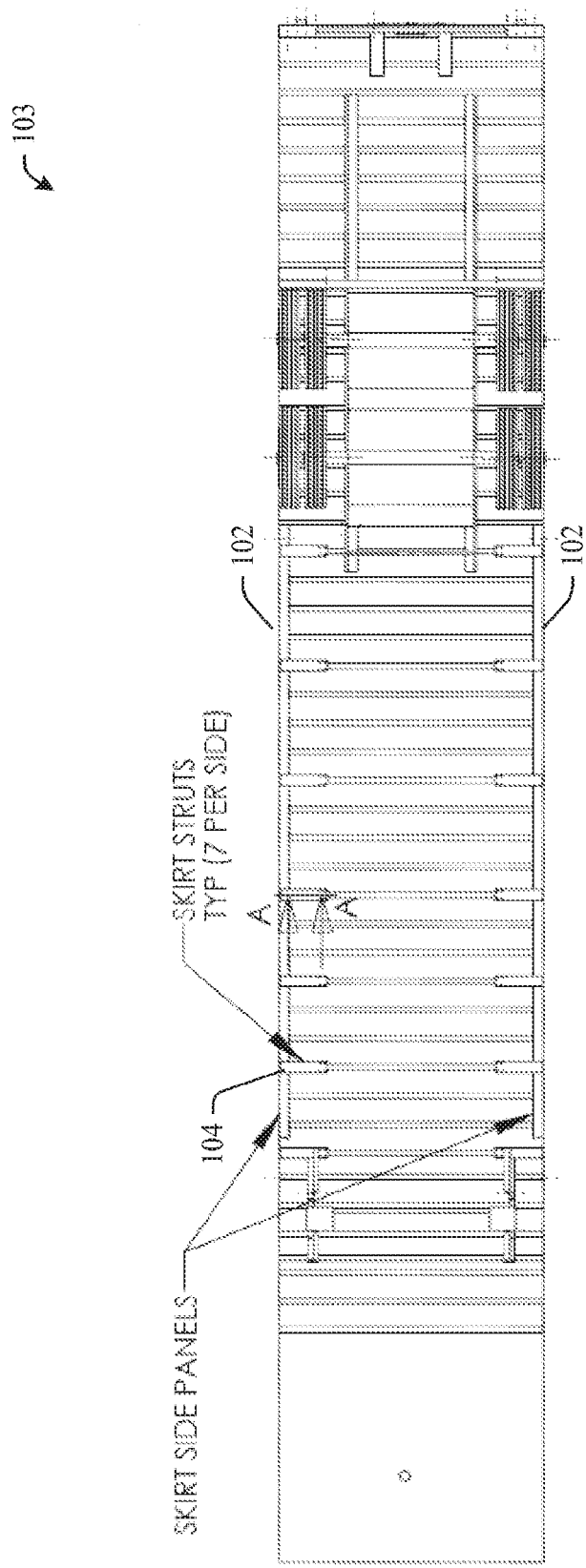
FIG. 1C illustrates an example bottom view of a straight skirt assembly in accordance with aspects of the innovation illustrated in FIG. 1A.

FIG. 1C illustrates a bottom perspective view of a skirt assembly system 103 in accordance with aspects of the innovation. As shown, system 103 includes two skirt panels 102 mounted straight along the sidewall of the trailer. As described supra, the skirt panels 102 can be manufactured of a resilient material, e.g., glass-based composites, plastic, rubber or the like.

With continued reference to the drawing, in this example, seven (7) struts 104 are mounted to fixedly attach the skirt panels 102 to the trailer cross-members or base rail, in some aspects. In other aspects, the struts 104 can be wholly contained within the skirt assembly vertical face and horizontal flange (106). This example will be better understood upon a review of the figures that follow. It is to be understood that, as needed, in lieu of or in combination with a molded skirt flange, additional mounting mechanisms (e.g., L-brackets) can be employed to affix the top of the skirt panels 102 to the underside (e.g., base rail) of the trailer. As described supra, while this aspect employs a strut assembly 104 that attached is positioned angularly between the skirt panel 102 and the base rail, other aspects employ struts that are wholly connected or affixed to the inner wall of the skirt panels 102.

Figure 2A:
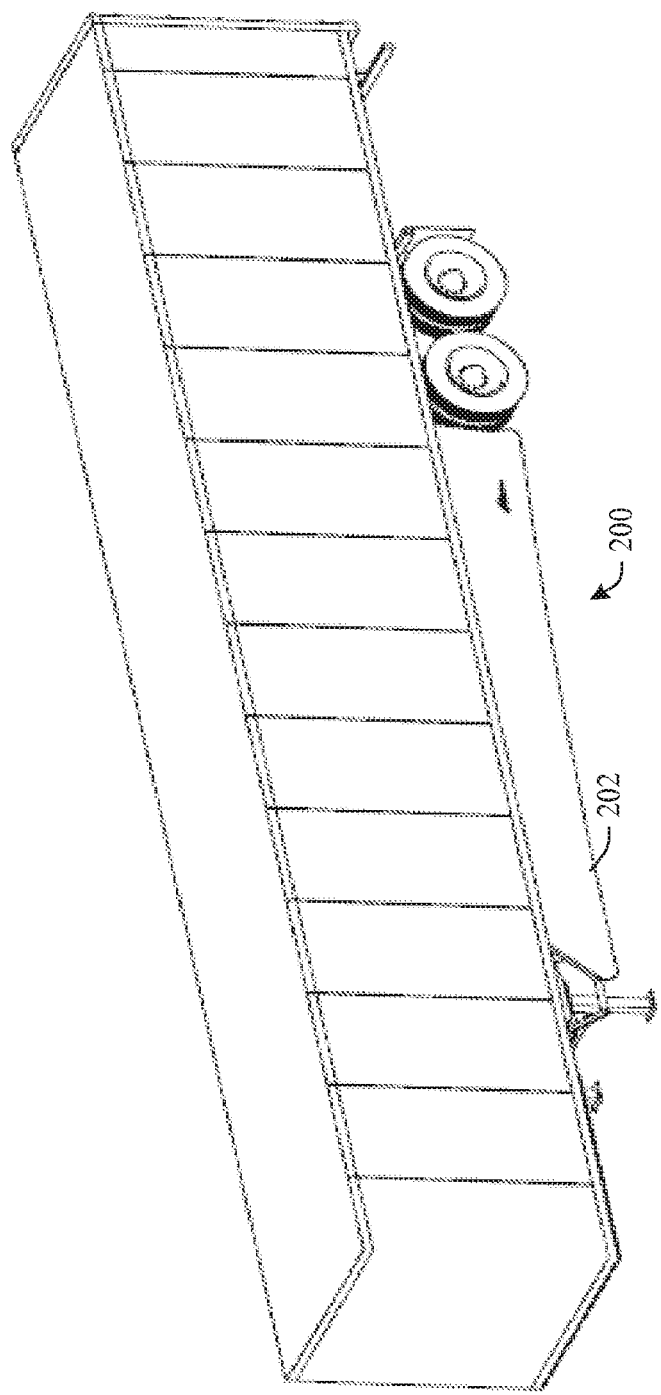
FIG. 2A illustrates an example straight-angled skirt assembly in accordance with aspects of the innovation.

Turning now to FIG. 2A, an example straight-angled skirt assembly 200 is shown in accordance with aspects of the innovation. As illustrated, a skirt panel 202 can be mounted straight yet angled inward toward the landing gear of the trailer (as shown). In other words, the skirt panel 202 can be mounted near (or at) the sidewall of the trailer near the rear wheels while angling inward toward the landing gear. This orientation will be better understood upon a review of FIG. 2C that follows.

Figure 2B:
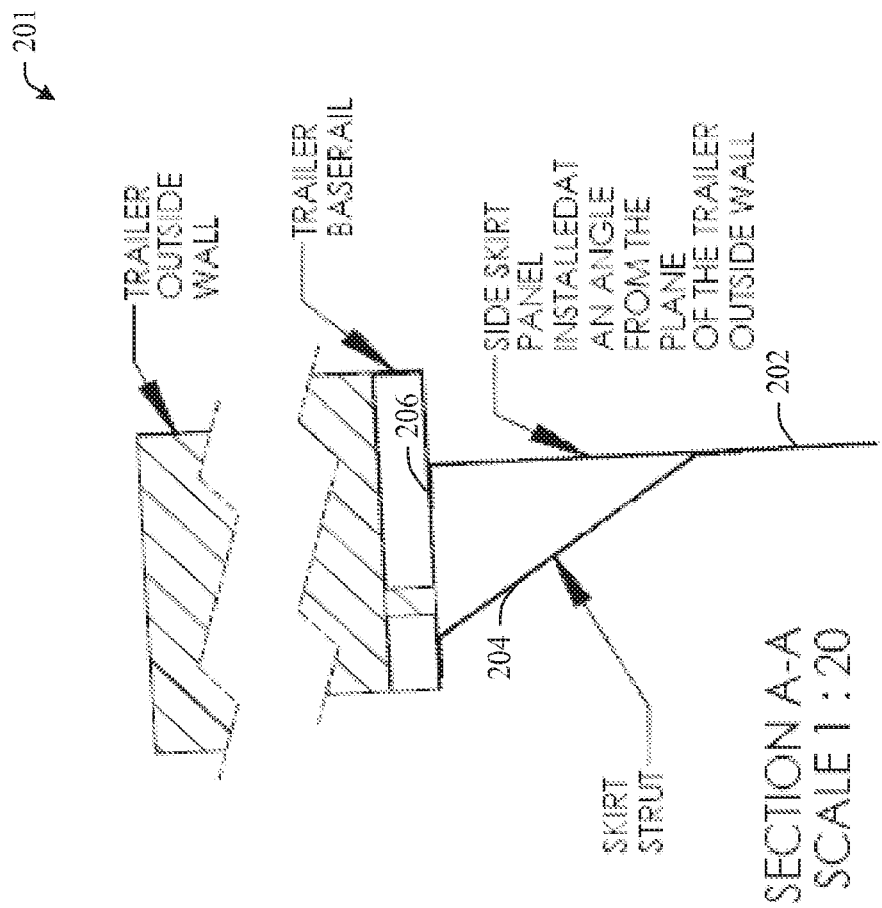
FIG. 2B illustrates an example angled brace that can be used in accordance with aspects of the innovation.

FIG. 2B illustrates an example strut assembly 201 in accordance with aspects of the innovation. As shown, the strut 204 can brace the skirt assembly 202 to the base rail of the trailer. In this example, the skirt panel 202 is angled from the plane of the trailer sidewall. Thus, the strut 204 and associated attachment means can be configured in order to effect such attachment (e.g., of variable lengths, inclusive of mounting hardware/brackets, etc.). Further, it will be appreciated that both the strut 204 and skirt panel 202 can be manufactured of resilient materials (e.g., flexible composite, plastic, rubber) such that when force is applied, the components (202, 204) can absorb the force (e.g., by flexing or bending). Once the force is alleviated, the components (202, 204) can return to their original shape. Further, it will be appreciated that, in all aspects described in this specification, if desired, non- or less-resilient materials can be employed where and if desired. As described in connection with FIGS. 1A-C, if desired, a horizontal mounting flange 206 can be extended such that the strut 204 is wholly positioned within the interior portion of the skirt 202.

Figure 2C:
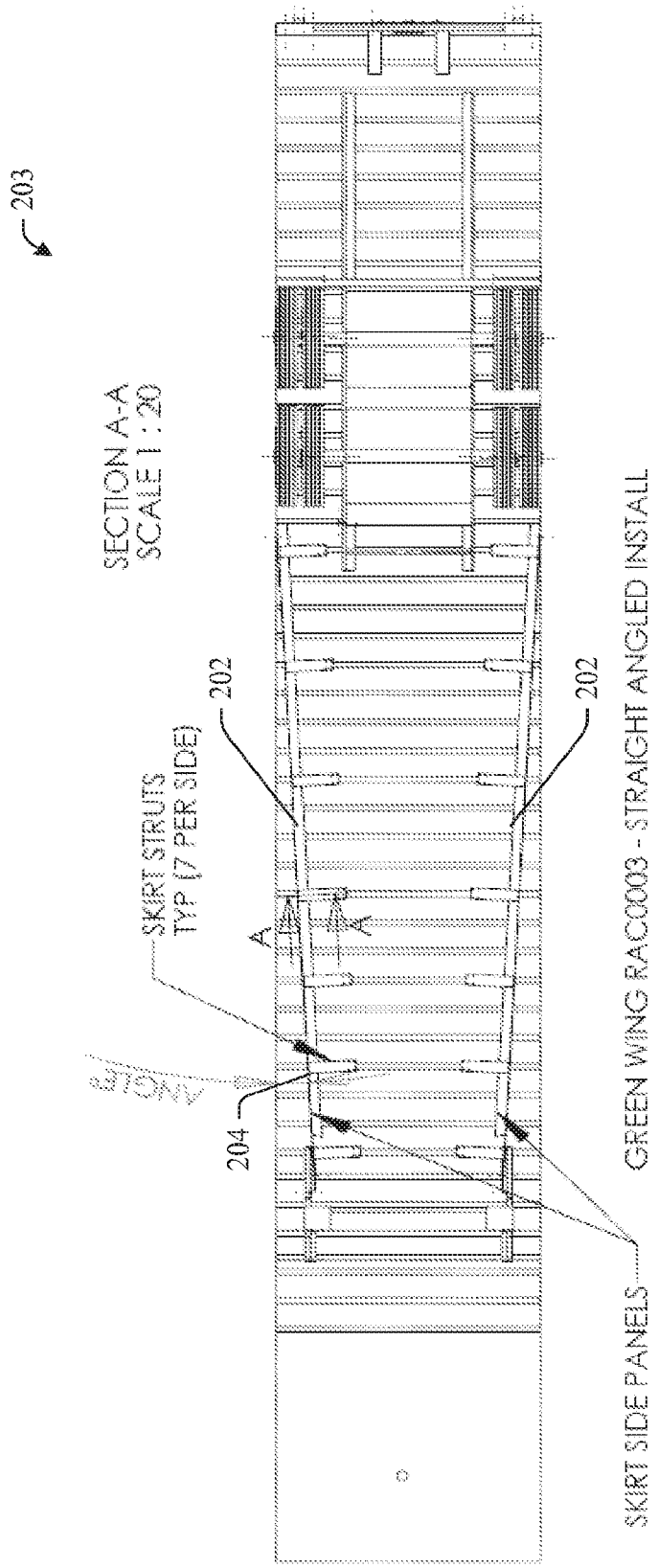
FIG. 2C illustrates an example bottom view of an example straight-angled skirt in accordance with aspects of the innovation illustrated in FIG. 2A.

FIG. 2C illustrates a bottom view of a skirt assembly system 203 in accordance with aspects of the innovation. As shown, system 203 can include two (2) straight side panels 202, each angled inward from the rear wheels and sidewall of the trailer. In this example, seven (7) braces or struts are applied to each skirt panel 202. As described above, the skirt panels 202 and struts 204 can be manufactured of a flexible or resilient material so as to absorb force or flex when appropriate (e.g., when a foreign object is struck).

Figure 3A:
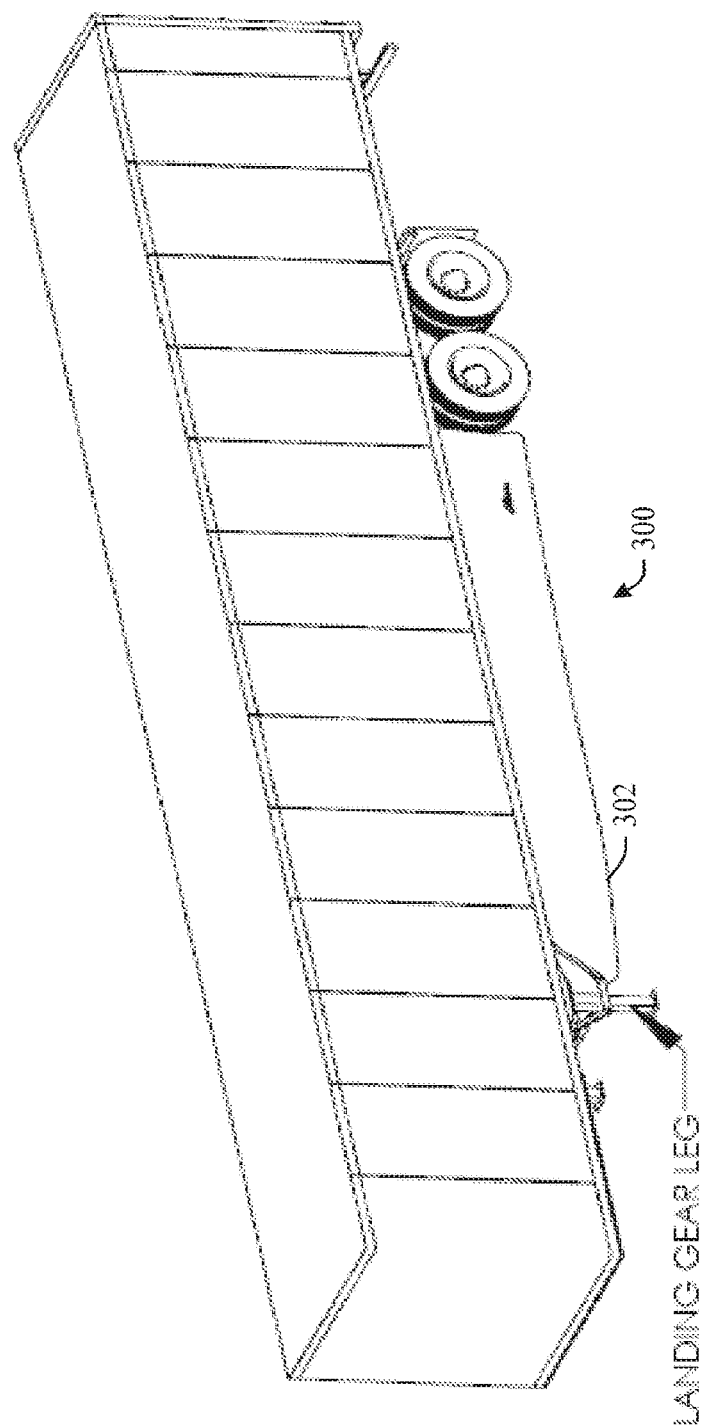
FIG. 3A illustrates an example curved skirt assembly in accordance with aspects of the innovation.

Referring now to FIG. 3A, an example curved skirt assembly 300 is shown. As illustrated, the skirt panel 302 has a front portion (e.g., near the landing gear) and a rear portion (near the rear trailer wheels). When mounted upon a trailer, as shown, the rear portion can be substantially in-plane with the trailer sidewall. As the skirt panel progresses toward the landing gear, the front portion curves inward toward the centerline of the trailer length. It will be understood that, while a curve is described, alternative effects can be employed that transition the front portion toward the centerline of the trailer. For example, a fold or angle (or series of folds/angles) can be employed in place of a curve without departing from the spirit and/or scope of the innovation.

Figure 3B:
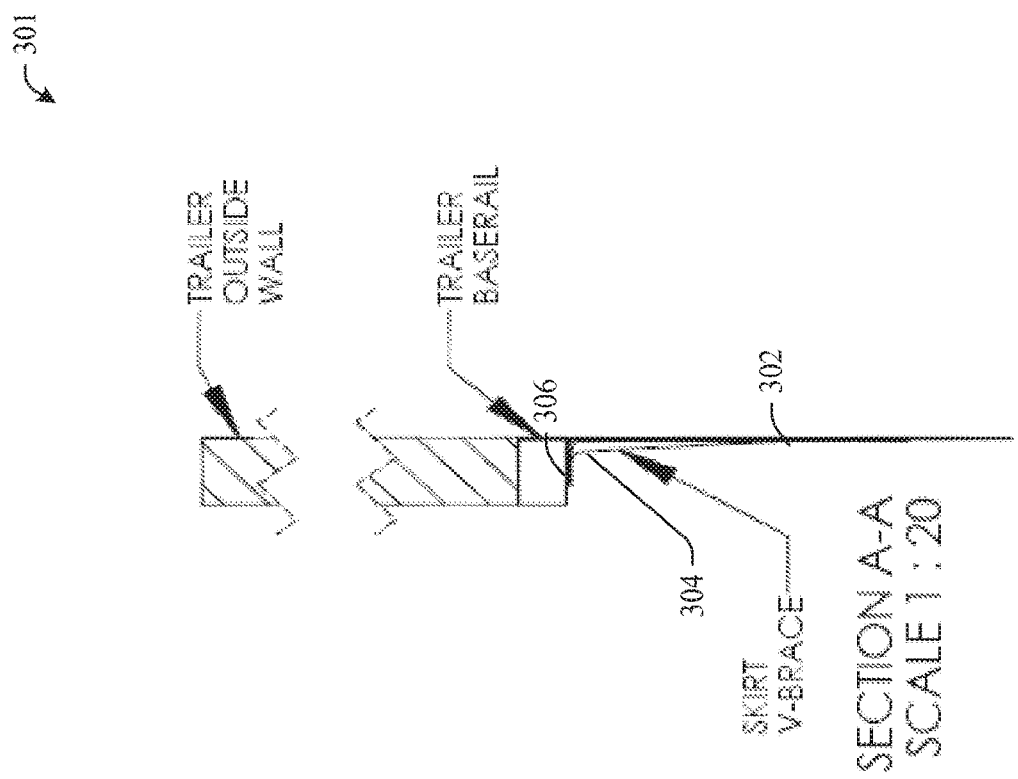
FIG. 3B illustrates an example "v-brace" support in accordance with aspects of the innovation.

FIG. 3B illustrates a bracing assembly 301 in accordance with aspects of the innovation. As shown, assembly 301 includes a 'v-brace' type strength member 304 that can be attached to the inner wall of the skirt panel 302. It will be appreciated that the 'v-brace' 304 can be wholly attached to the inner wall of the skirt panel 302 without directly mounting to the trailer base rail. In alternative aspects, if desired, the 'v-brace' 304 can be attached to the base rail on its top portion. However, it is to be understood that because the skirt assembly 302 is equipped with an upper flange 306, the brace need not directly communicate with the underside of the trailer (e.g., base rail, cross members, etc.). Consistent with the aforementioned examples, the 'v-brace' 304 and skirt panel 302 can be manufactured of flexible and resilient materials that are capable of absorbing force and bending (or flexing) when appropriate. However, it is to be understood that in alternative aspects, the v-brace 304 and/or skirt assembly 302 can be manufactured of most any materials including, but not limited to composites, metals, resins, alloys or the like. These alternatives are to be included within the scope of this disclosure and claims appended hereto.

Figure 3C:
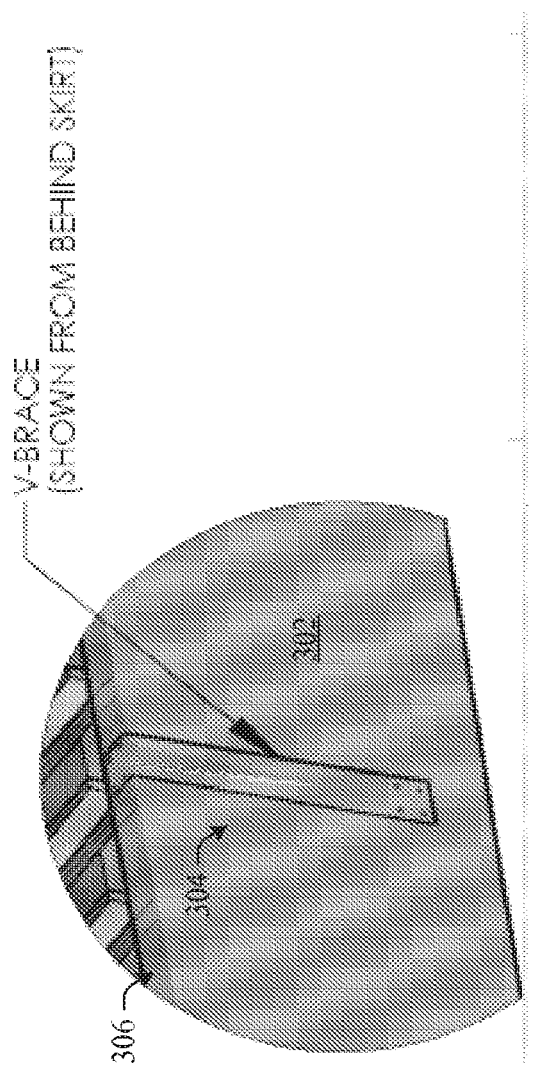
FIG. 3C illustrates an alternative view of an example "v-brace" support in accordance with aspects of the innovation.

Referring now to FIG. 3C, an alternate view of a 'v-brace' 304 mounted on the inner wall of skirt panel 302 is shown. As explained above, in aspects, the 'v-brace' 304 can be mounted wholly onto the skirt panel 302. The bottom portion of the brace 304 can be attached, e.g., bolted into or through, to the skirt panel 302. The top portion, as shown, can be attached to an upper lip or flange 306 of the skirt panel 302, for example, without touching the base rail or undercarriage of the trailer.

Figure 3D:
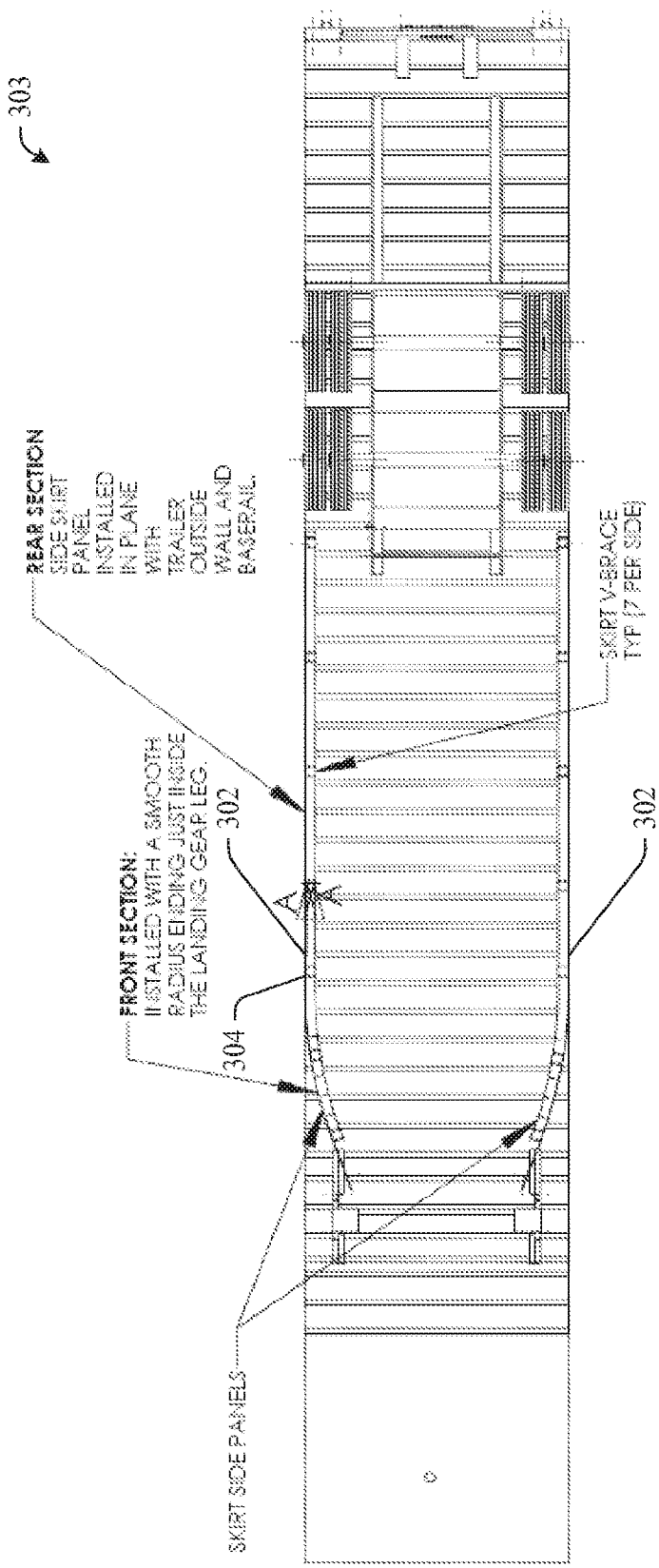
FIG. 3D illustrates an example bottom view of a curved skirt assembly in accordance with aspects of the innovation illustrated in FIG. 3A.

Referring now to FIG. 3D, a bottom view of a skirt assembly system 303 in accordance with aspects of the innovation is shown. As illustrated, two (2) skirt panels 302 can be installed with the rear portion in-plane with the outside wall of the trailer. The forward portion of the skirt panels 302 can include a smooth radius or curve the ends just inside, outside or even with the landing gear leg(s).

Upon installation, a number of 'v-braces' 304 can be applied to the inner wall of the skirt panel 302. These braces 304 can provide rigidity to the panel, e.g., to withstand wind load. In the example of FIG. 3D, seven (7) braces 304 are employed. However, it is to be appreciated that in this example, as well as others described herein, more or fewer braces (e.g., 104, 204, 304) can be employed as desired or appropriate.

Figure 4A:
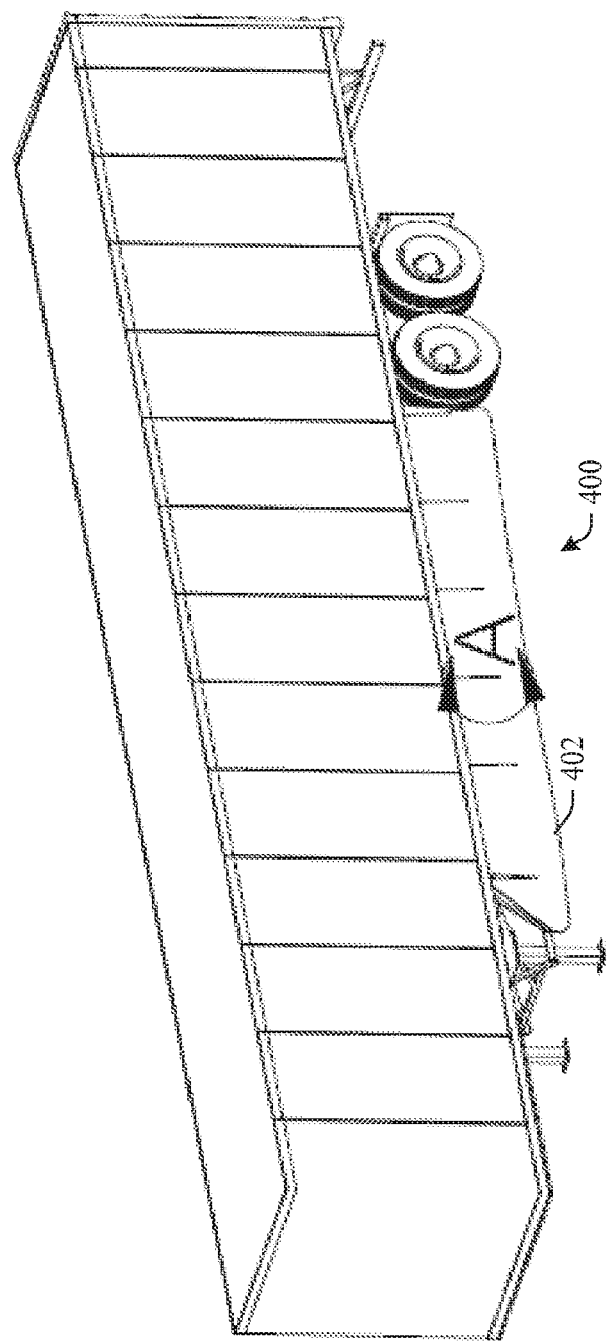
FIG. 4A illustrates an example curved skirt assembly in accordance with aspects of the innovation.

Turning now to FIG. 4A, an example curved skirt assembly 400 is shown. As illustrated in the example, the rear portion of a skirt panel 402 can be positioned parallel to or in-plane with the outer wall of the trailer. The forward portion can progressively curve or be otherwise formed/configured with a smooth curve so as to transition inward toward the landing gear of the trailer. Additionally, if desired, the skirt panel 402 can be equipped with a top to bottom curve (A) as desired.

Figure 4B:
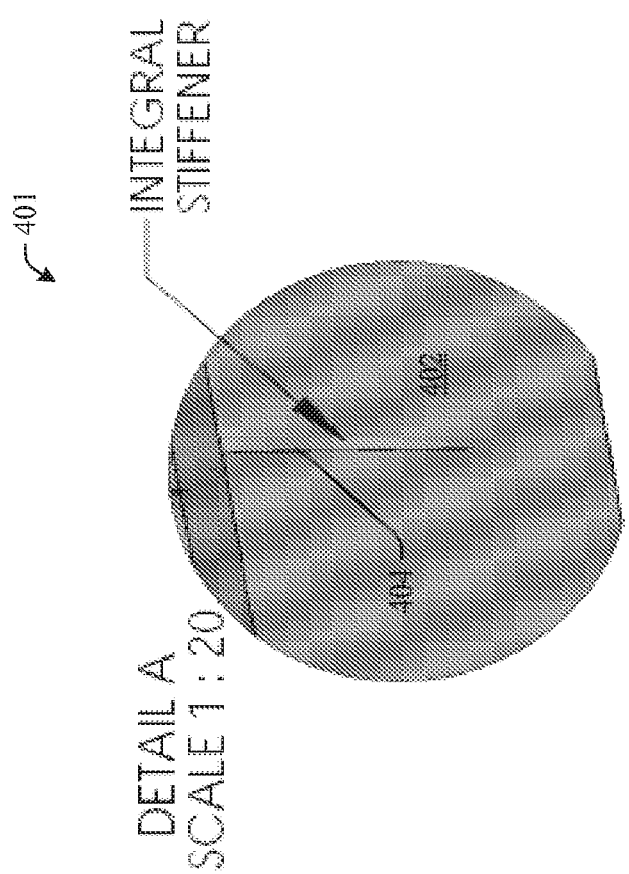
FIG. 4B illustrates an example integral stiffener that can be employed in accordance with aspects of the innovation.

FIG. 4B illustrates an example integral stiffener assembly 401 in accordance with aspects of the innovation. As illustrated, an internal stiffener or bracing member 404 can be molded (or manufactured) into the skirt panel 402 thereby providing strength to the sidewall of the skirt 402. As described supra, the skirt panel 402 can be manufactured of a flexible and resilient material such that it can absorb forces and flex when and where appropriate. In this aspect, the integral bracing member 404 can be a molded 'rib' design made completely of the same resilient material as the skirt panel 402. In alternative aspects, the integral bracing member 402 can be reinforced if appropriate, e.g., using an internal structural brace (not shown). While alternative materials can be employed, the integral stiffener 404 can be configured to absorb flex or otherwise be resilient so as to flex, e.g., to react to foreign obstructions or wind deflections as appropriate.

Figure 4C:
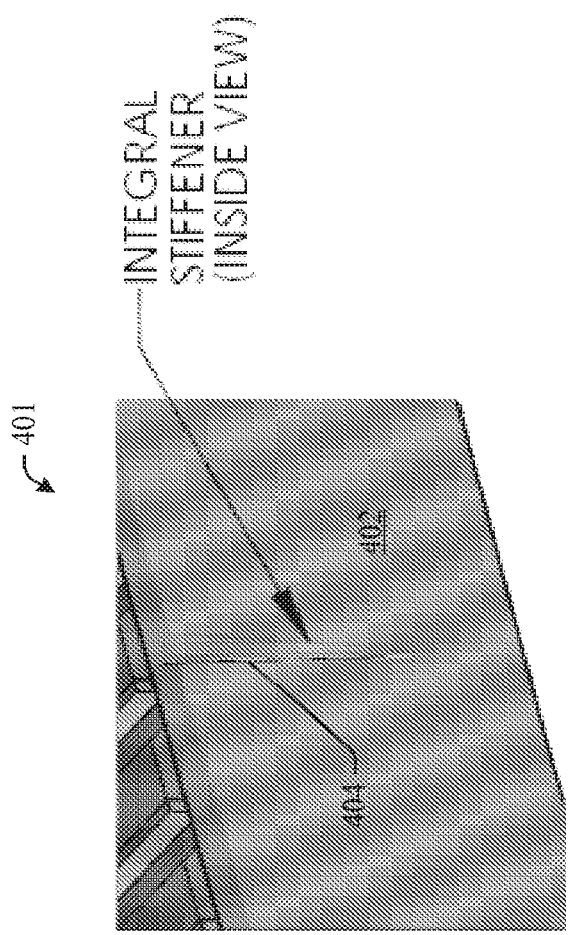
FIG. 4C illustrates an alternative view of an integral stiffener that can be used in accordance with aspects of the innovation.

FIG. 4C illustrates an alternative inside view of an internal brace or 'rib' assembly 401. As shown, the brace 404 can be molded internal to a composite or plastic skirt panel 402. This rib 404 provides stiffening or bracing properties to the panel 402. While a specific example of providing the rib 404 internal to the skirt panel 402 is shown, it is to be appreciated that, in other aspects, the rib 404 need not be visibly positioned on either sidewall (inner or outer) of the panel 402. Rather, the rib 404 can be molded in the middle between each of the walls such that it is hidden from view. Additionally, if preferred, the rib 404 can be visible on the outward (or inward) facing wall of the skirt panel 402.

Figure 4D:
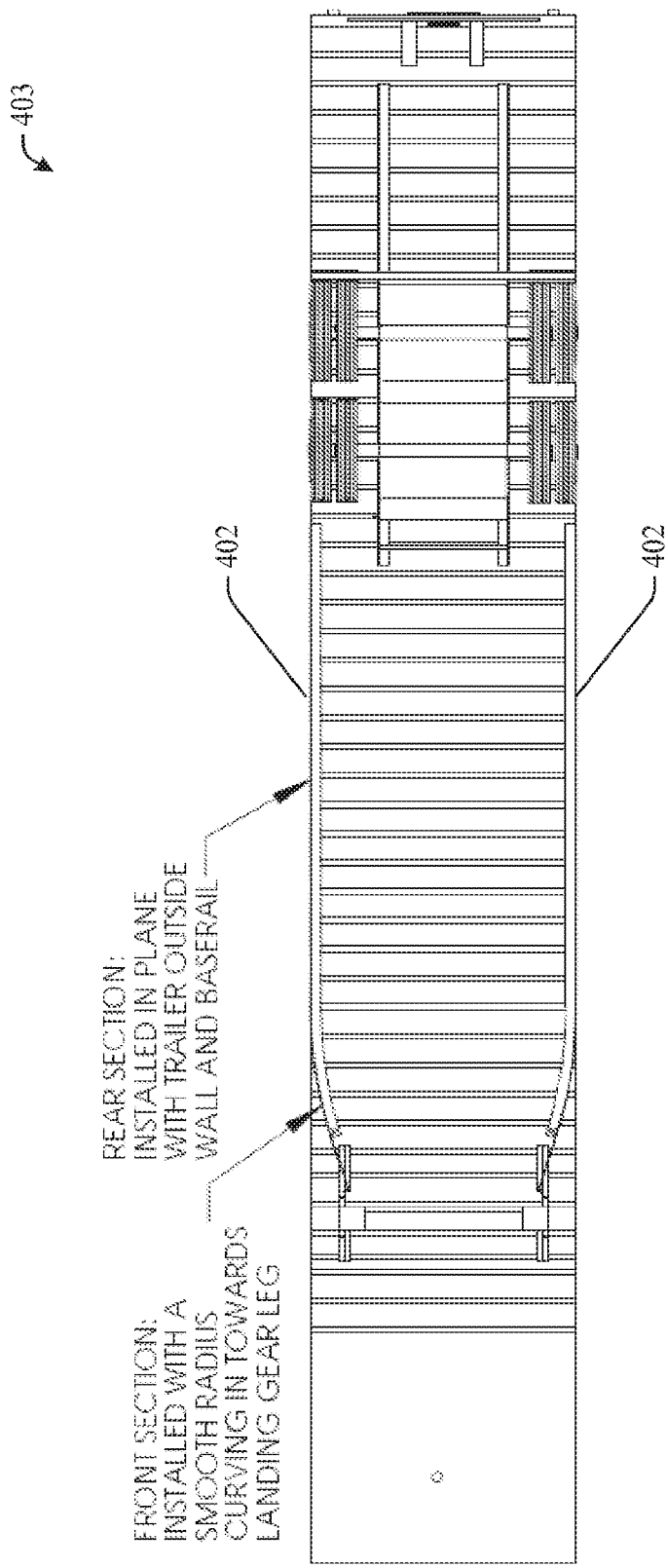
FIG. 4D illustrates a bottom view of a curved skirt assembly in accordance with aspects of the innovation illustrated in FIG. 4A.
Figure 5:
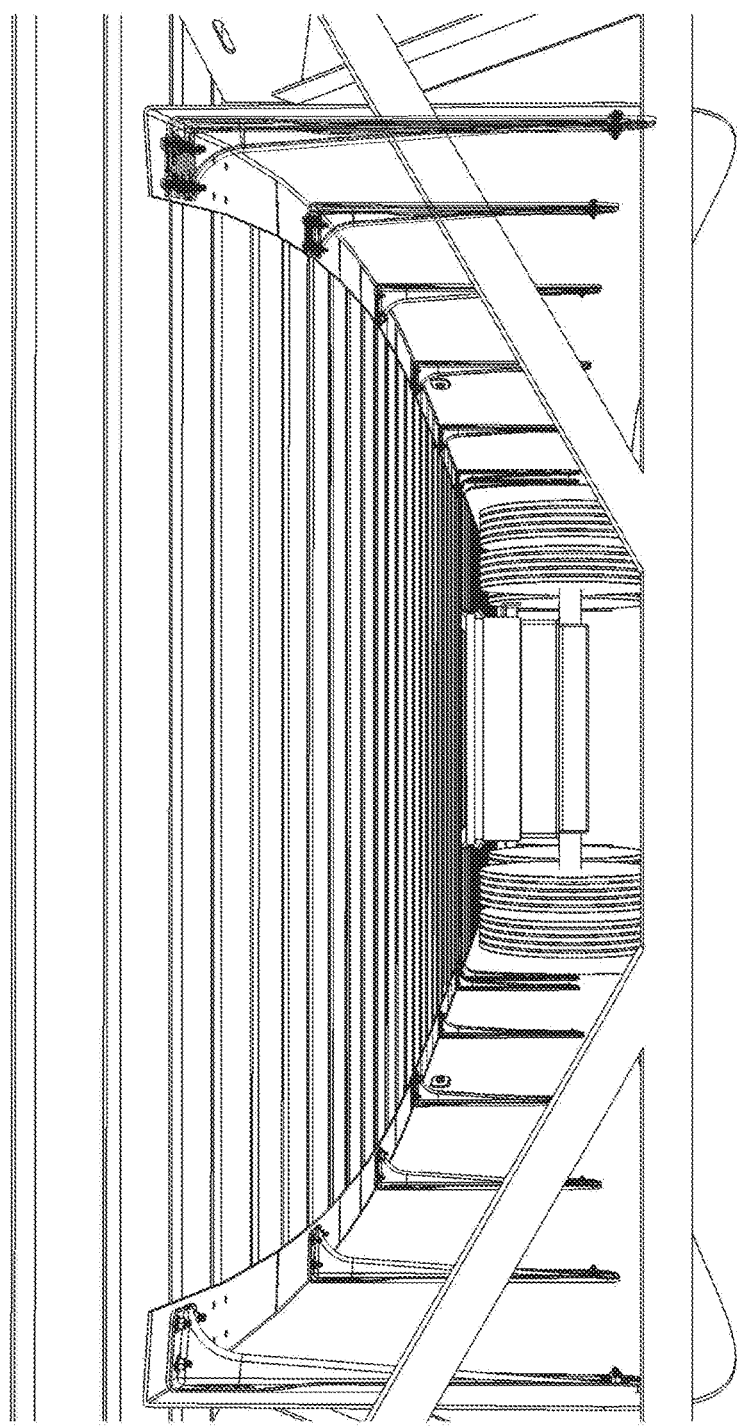
FIG. 5 is an example photograph of skirt assemblies that employ 'v-braces' in accordance with an aspect of the innovation.
Figure 6:
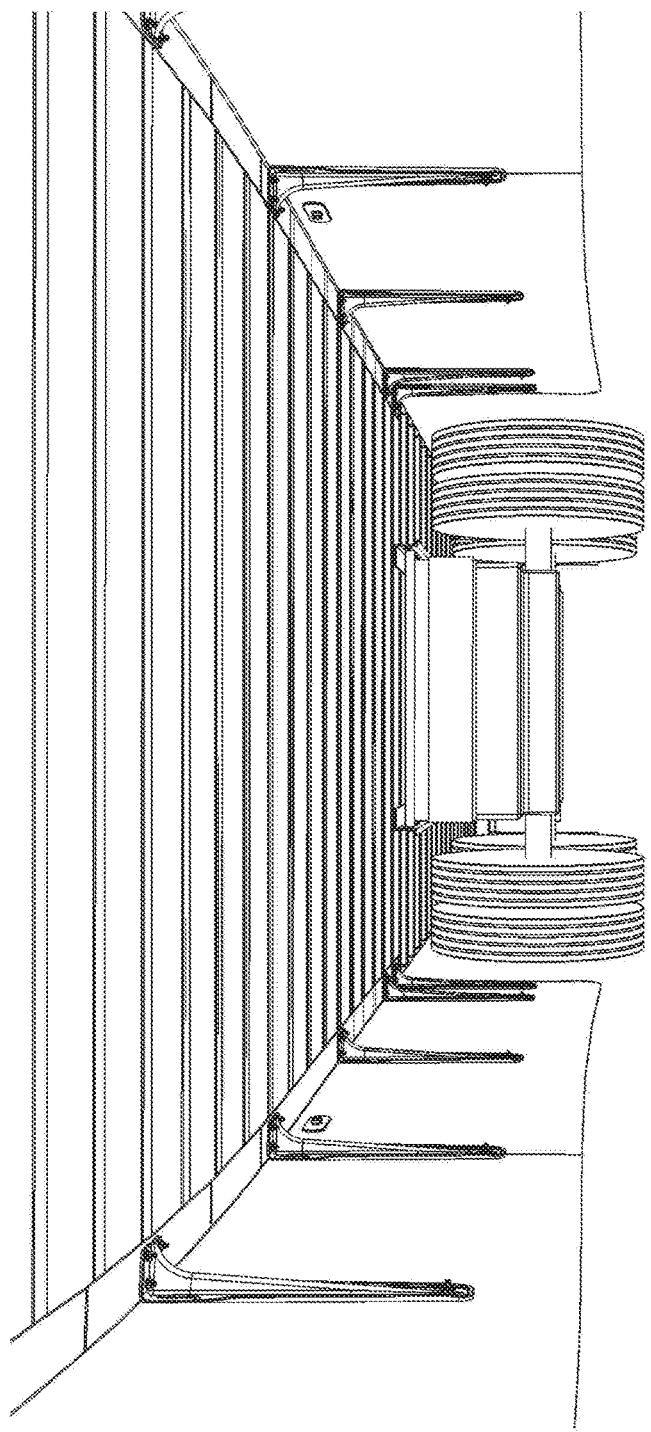
FIG. 6 illustrates an example view of skirt assemblies that employ 'v-braces' in accordance with an aspect of the innovation.

Referring now to FIG. 4D, an example bottom view of a skirt assembly system 403 is shown. Consistent with the orientation of FIG. 3D, the skirt panels 402 progressively curve inward to the landing gear. As described in FIGS. 3A, 3B and 3C, the skirt panel 402 can be equipped with an integral brace or 'rib' that enhances rigidity of the panel, for example, to withstand wind pressure. Additionally, the skirt panel 402, inclusive of the 'rib,' can be manufactured of a flexible or resilient material that can flex or bend under pressure and regain its orientation once the pressure is removed.

In the examples described herein, the leading edge of the skirt's profile can catch "dirty" air just behind the tractor's duels and redirect the turbulence into a laminar flow resulting in less drag on the trailer. Still further, as described herein in the aspects illustrated in the figures, advancements in materials have permitted flexible materials to be used in skirt panel design. Without sacrificing fuel savings, these flexible (or resilient) designs allows the trailer to travel over mid-trailer obstacles such as railroad tracks and sunken docks easier than conventional designs. In aspects, glass content in the panels allows product impact with no permanent set. In other words, resilient skirts (and braces or supports) can have a "memory" and always return to flat (or original) shape.

Figure 7:
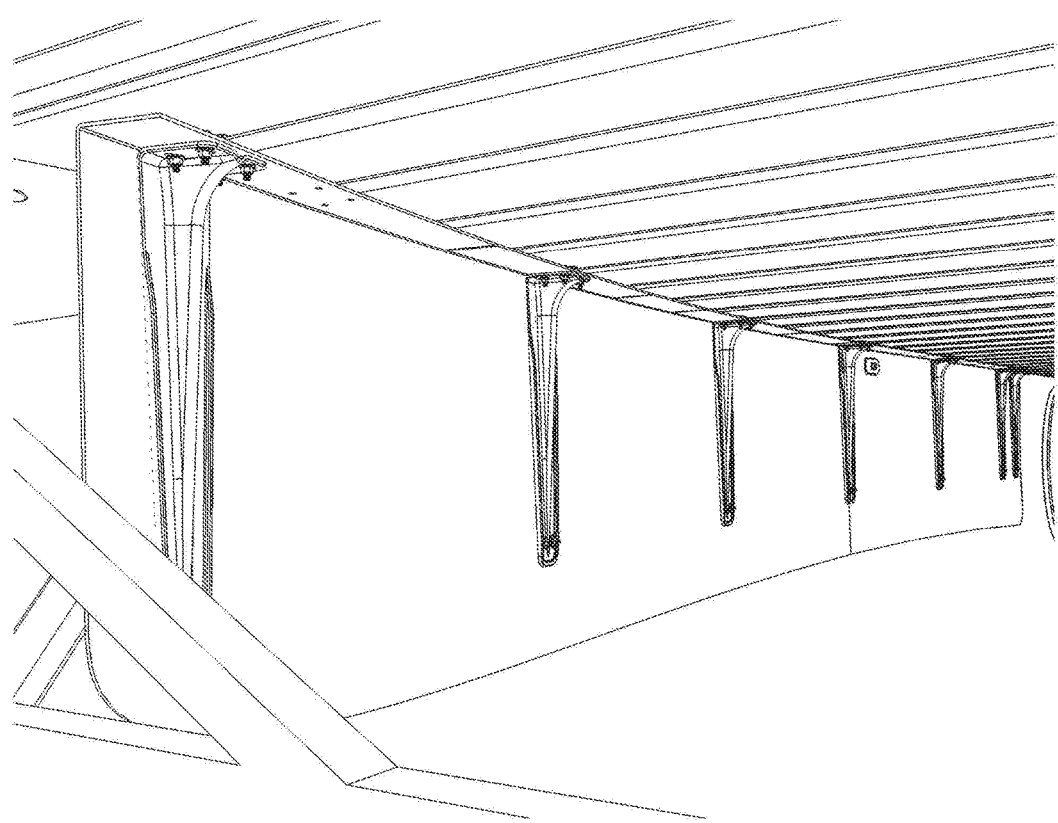
FIG. 7 illustrates an example 'v-bracing' system in accordance with aspects of the innovation.
Figure 8:
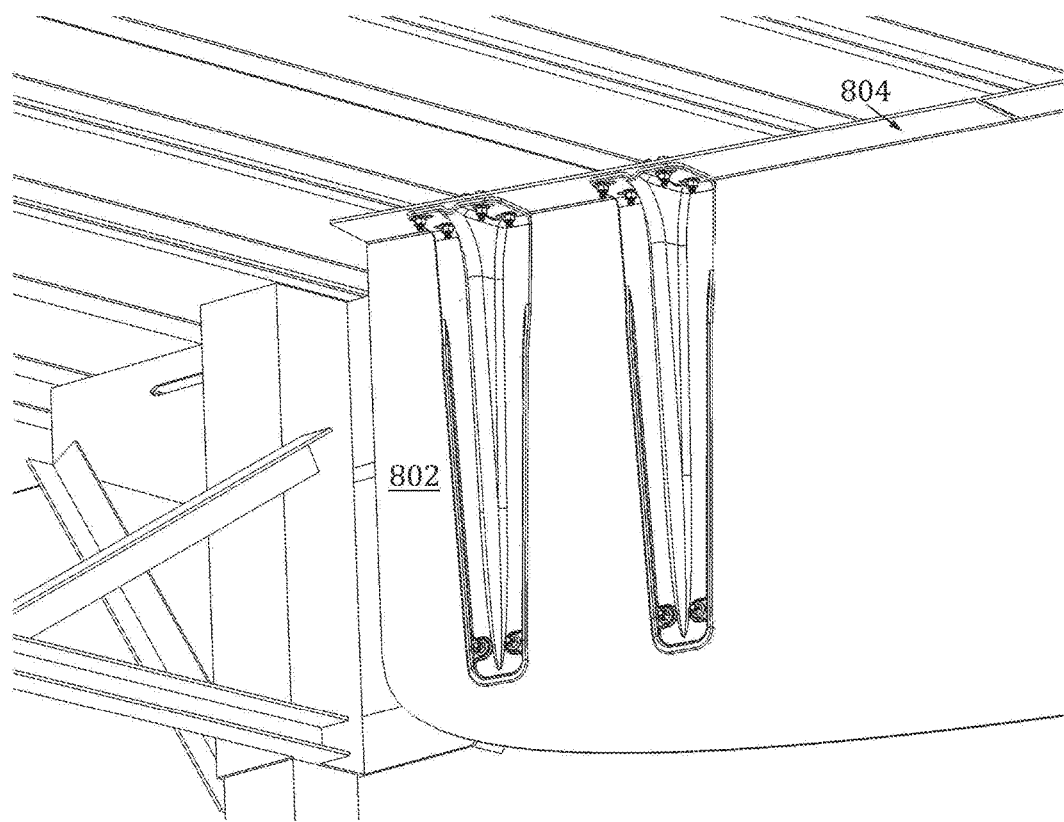
FIG. 8 illustrates an alternative view of an example 'v-bracing' system in accordance with aspects of the innovation.
Figure 9:
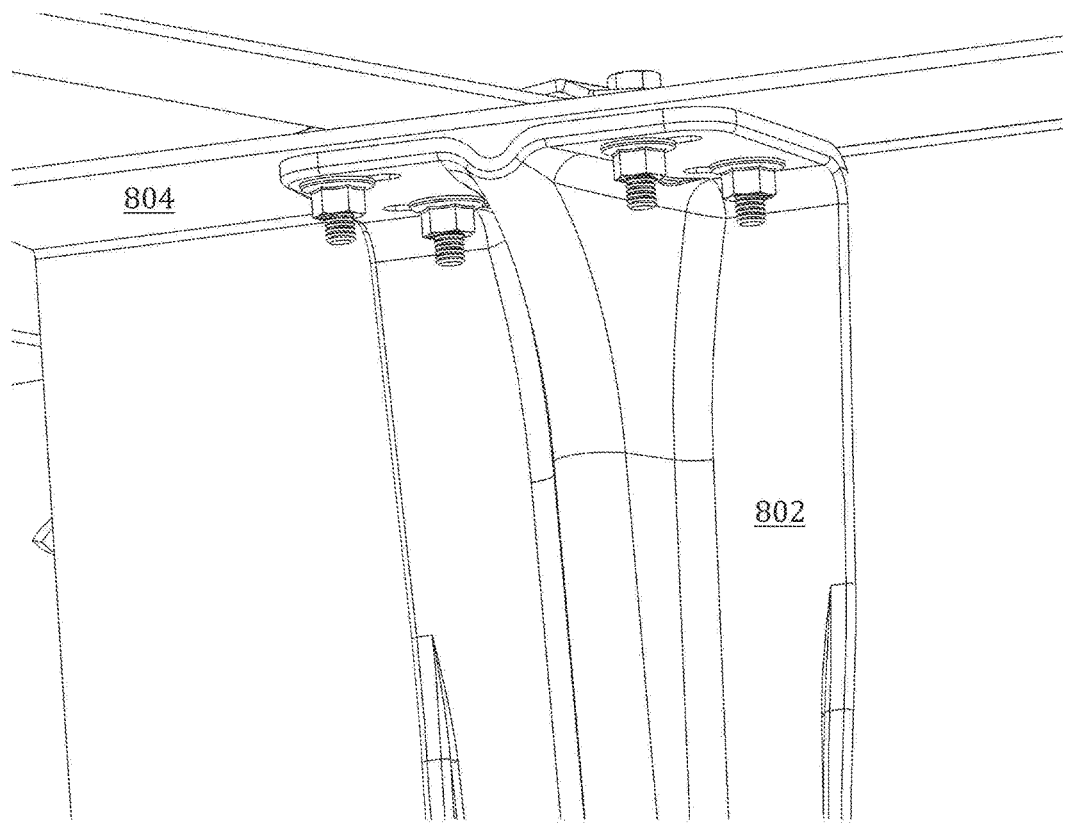
FIG. 9 illustrates an example 'v-brace' top attachment means in accordance with aspects of the innovation.

FIGS. 5 to 9 illustrate visual depictions of an example implementation of the 'v-brace" described supra in FIGS. 3A-D. Particular attention is drawn to FIGS. 8 and 9. In these figures, it is clear that the 'v-brace' can be attached wholly to the interior face of the skirt panel. Depending on the skirt panel shape, as illustrated in FIG. 7, one or more of the 'v-braces' can be attached between the skirt and the cross-member of the trailer. The example shown in FIG. 7 is merely an example whereas, other aspects exist whereby all braces are tucked or otherwise positioned wholly with the skirt inner sidewall 802 and upper flange 804. In other words, the forward most bracket need not connect directly to the trailer base rail as shown. In an alternative configuration, the forward most portion of the skirt can be shaped differently so as to accommodate position of the brace within the skirt panel interior (e.g., connecting between the inside panel wall and the flange).

However, it should be understood that the attachment points are design considerations and may vary between implementations without departing from the spirit and/or scope of the innovation and claims appended hereto. Further, it is to be understood that vertical bracing means that may attach directly between the skirt and the trailer undercarriage may be rigid supports by design.

Figure 10:
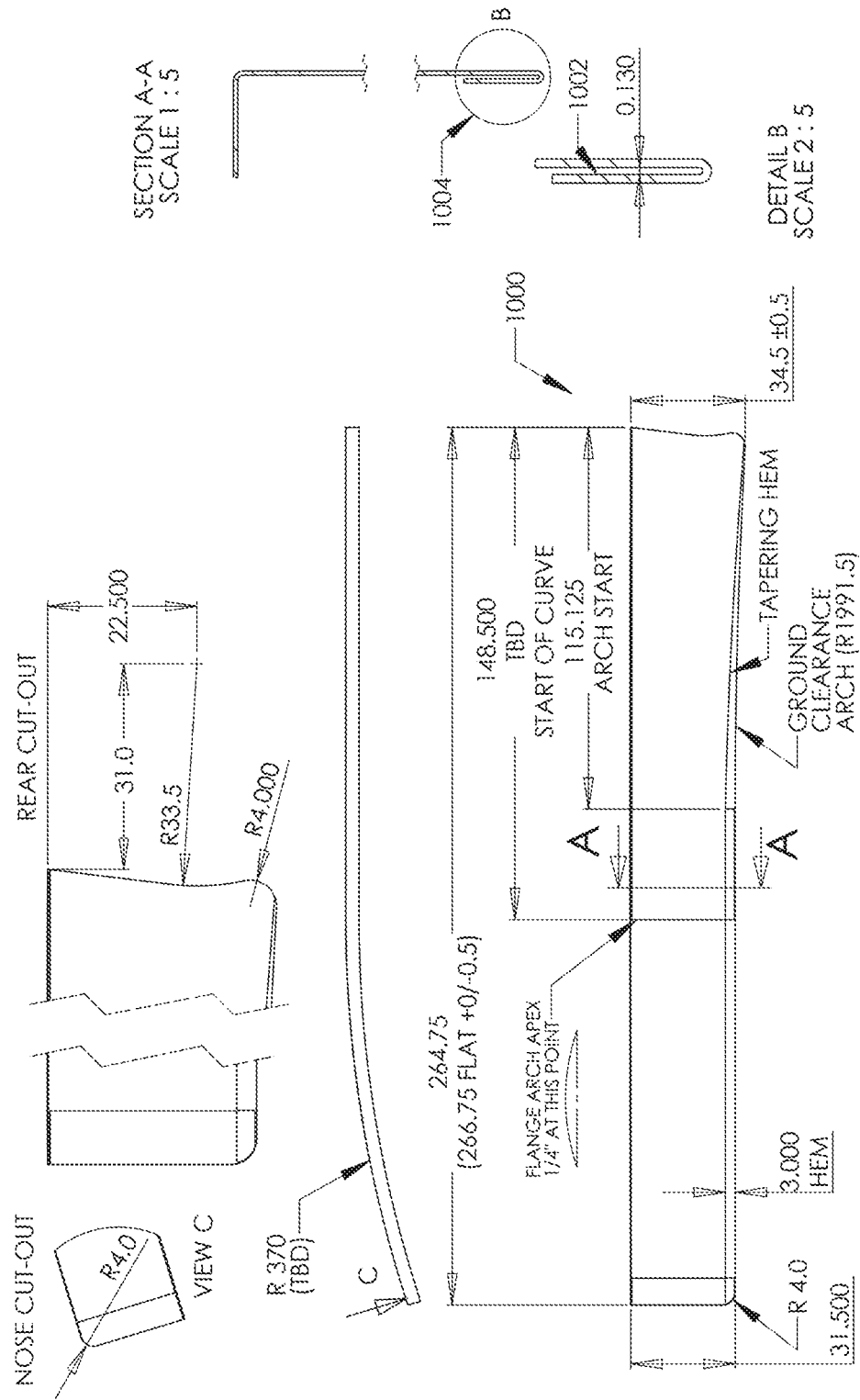
FIG. 10 illustrates an example "hemmed" skirt design in accordance with aspects of the innovation.

Turning now to FIG. 10, an alternative "hemmed" skirt assembly is shown in accordance with aspects of the innovation. It is to be understood that the skirt assembly shown and described with reference to FIG. 10 can be used in most any configuration, straight, straight-angled, angled or even curved, as appropriate or desired. As well, the skirt assembly design of FIG. 10 can be employed with most any bracing or support means including those described herein, e.g., angular strut, v-brace, integral brace, among others.

Essentially, the skirt design of FIG. 10 can employ a "hem" or overlap whereby the material can be folded over or otherwise increased in thickness (e.g., doubled). In this aspect, the composite or flexible skirt assembly employs a tapering hem that is wider in the front portion (near the landing gear) and which tapers toward the rear of the trailer as shown. It is to be understood that this tapered hem is a design choice and can vary in alternative aspects without departing from the features, functions and benefits of the thicker lower material.

With continued reference to FIG. 10, a close-up of a hem is shown in items 1002 and 1004. While the hem shown herein is a folded hem, it is to be understood that alternative aspects can employ a "double-ply" type hem whereas thickness of skirt material are affixed together (e.g., via adhesive) so as to increase overall thickness, essentially creating a hem-like thickness. It will be understood and appreciated that this "hem" can enhance strength of the skirt, for example, when contacting foreign objects such as railroad tracks, loading docks, debris, etc.

Figure 11:
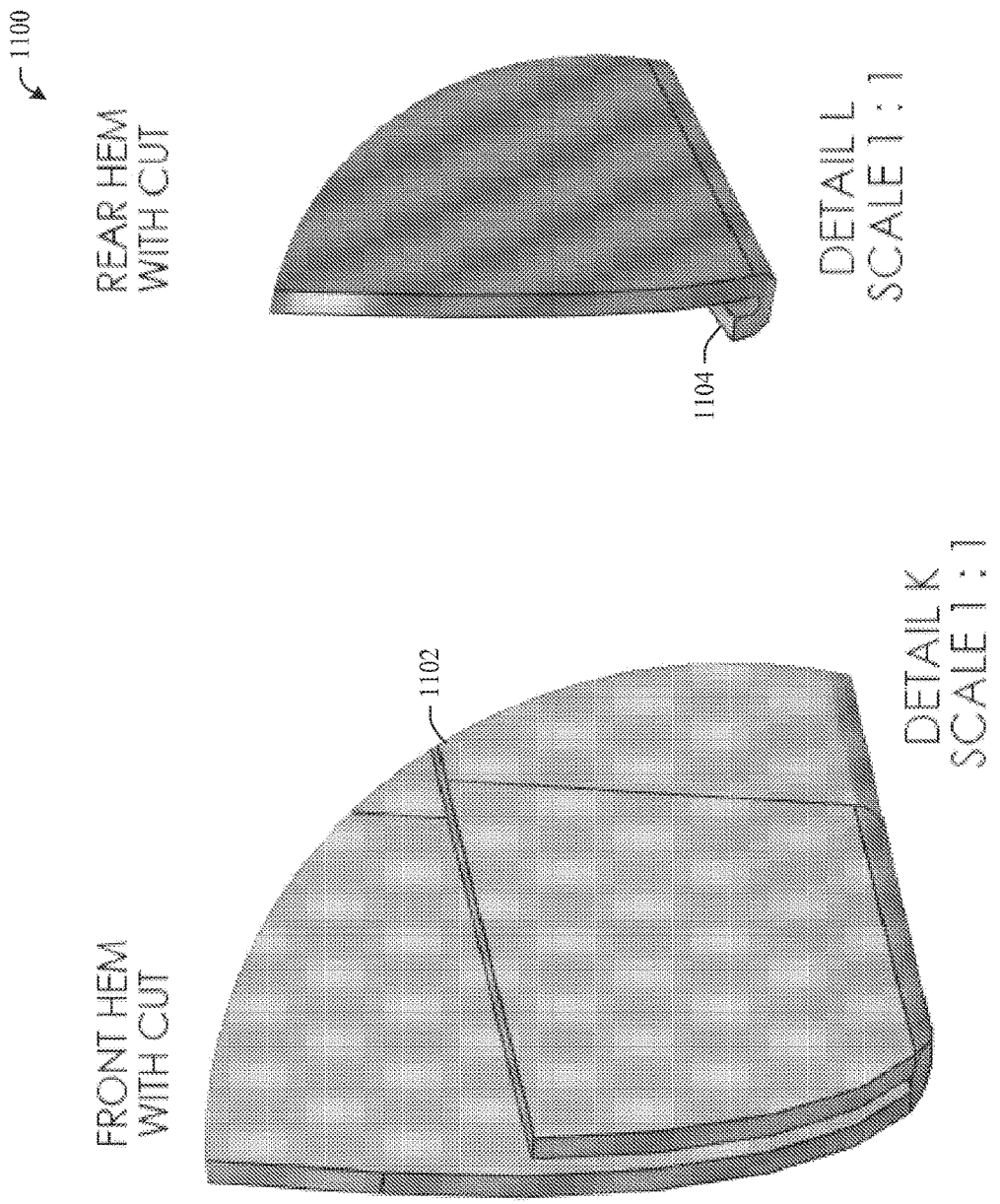
FIG. 11 illustrates close-up views of a front and rear portion of a tapered hem in accordance with aspects of the innovation.

FIG. 11 illustrates close-up views 1100 of each the front and rear hem 1002, 1004 respectively. Here, as described above, the hem can be tapered whereas the front hem 1002 is a wider hem than that shown at the rear 1004. It is to be understood that the tapered hem and overall hem width is a design consideration that can vary between implementations as appropriate or desired. In other words, these alternative aspects are to be included within the scope of this disclosure and claims appended hereto.

Figure 12:
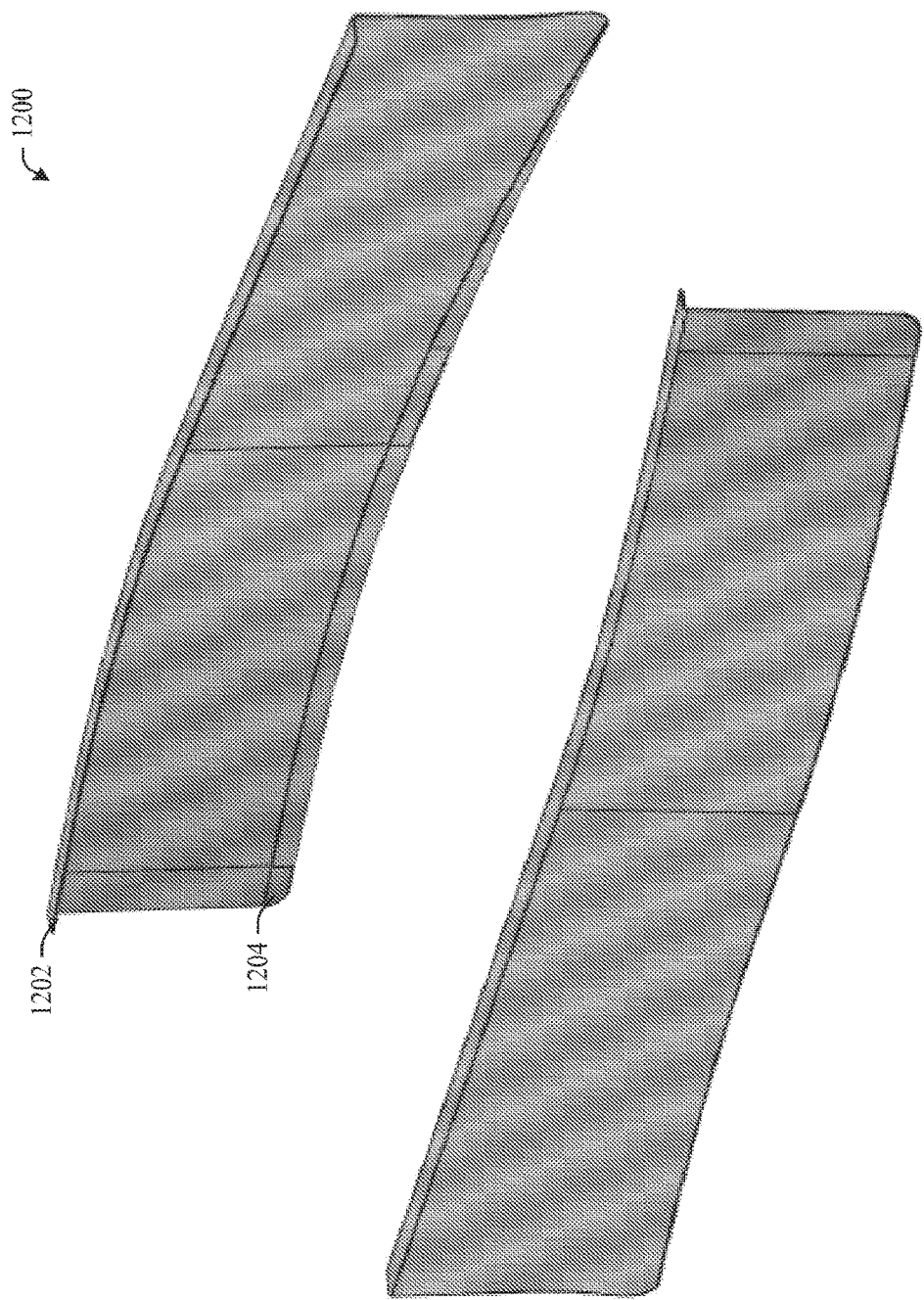
FIG. 12 illustrates an example pair of hemmed skirt assemblies having an upper flange that facilitates integral bracing in accordance with aspects of the innovation.

FIG. 12 illustrates a pair of resilient or flexible skirt assemblies 1200 each having an upper flange 1202 and a tapered hem 1204 as described herein. It is to be appreciated that, in this example, the hem 1204 is revealed on the inner side of the skirt assembly and cannot be seen from the outer wall (lower pictured skirt).

Figure 13:
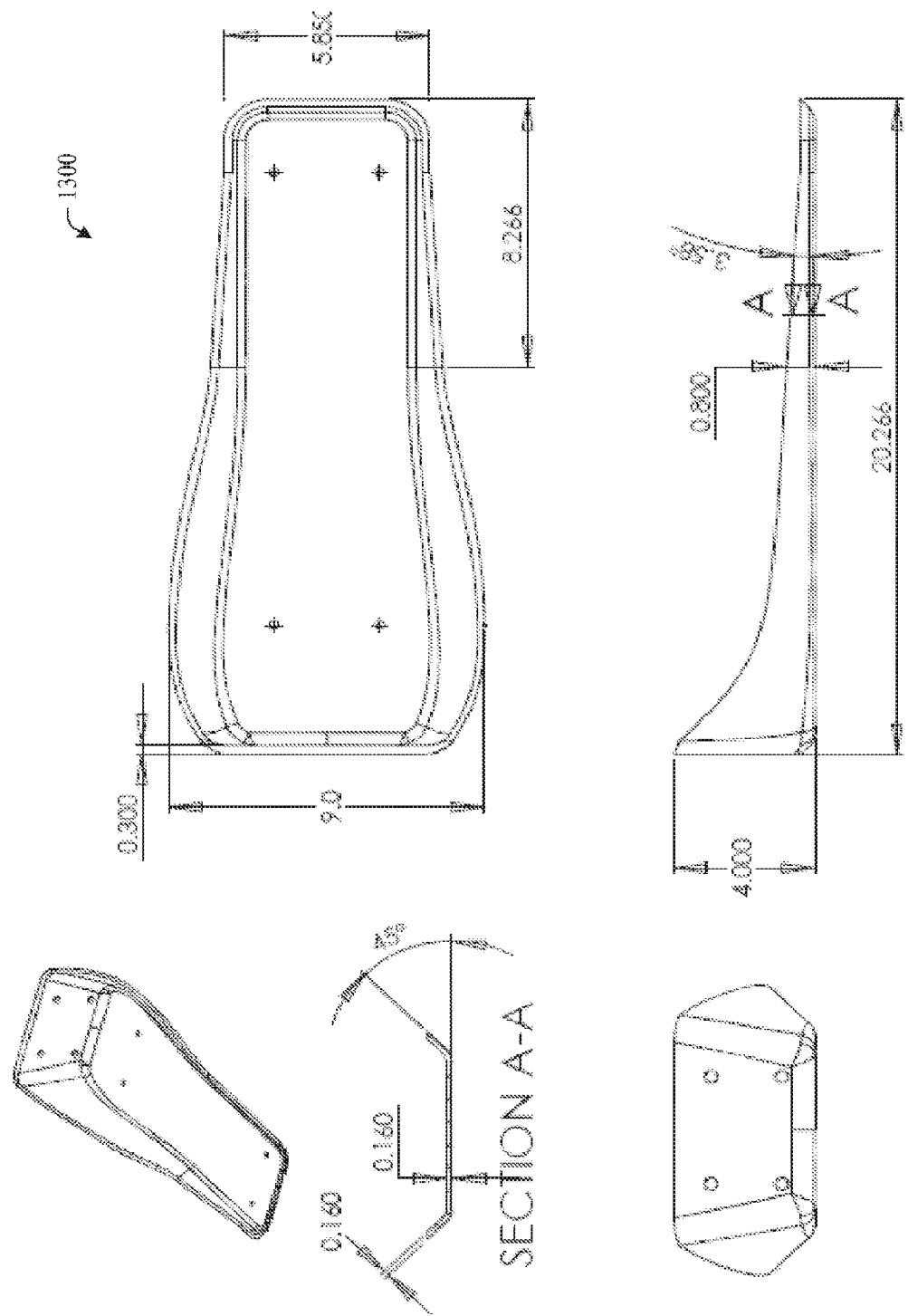
FIG. 13 illustrates an example bracing system in accordance with aspects of the innovation.

FIG. 13 illustrates yet another bracing system in accordance with an aspect of the innovation. Here, an angular tray-like device 1300 can be constructed and mounted to the inner wall of a trailer skirt thereby enhancing rigidity while maintaining flexibility of the skirt design. The bracing system can perform the same or similar function as the v-brace and integral rib described supra. It is to be understood that the apparatus of FIG. 13 can include resilient or flexible properties and be applied to all skirt designs and configurations as disclosed and described herein.

Figure 14:
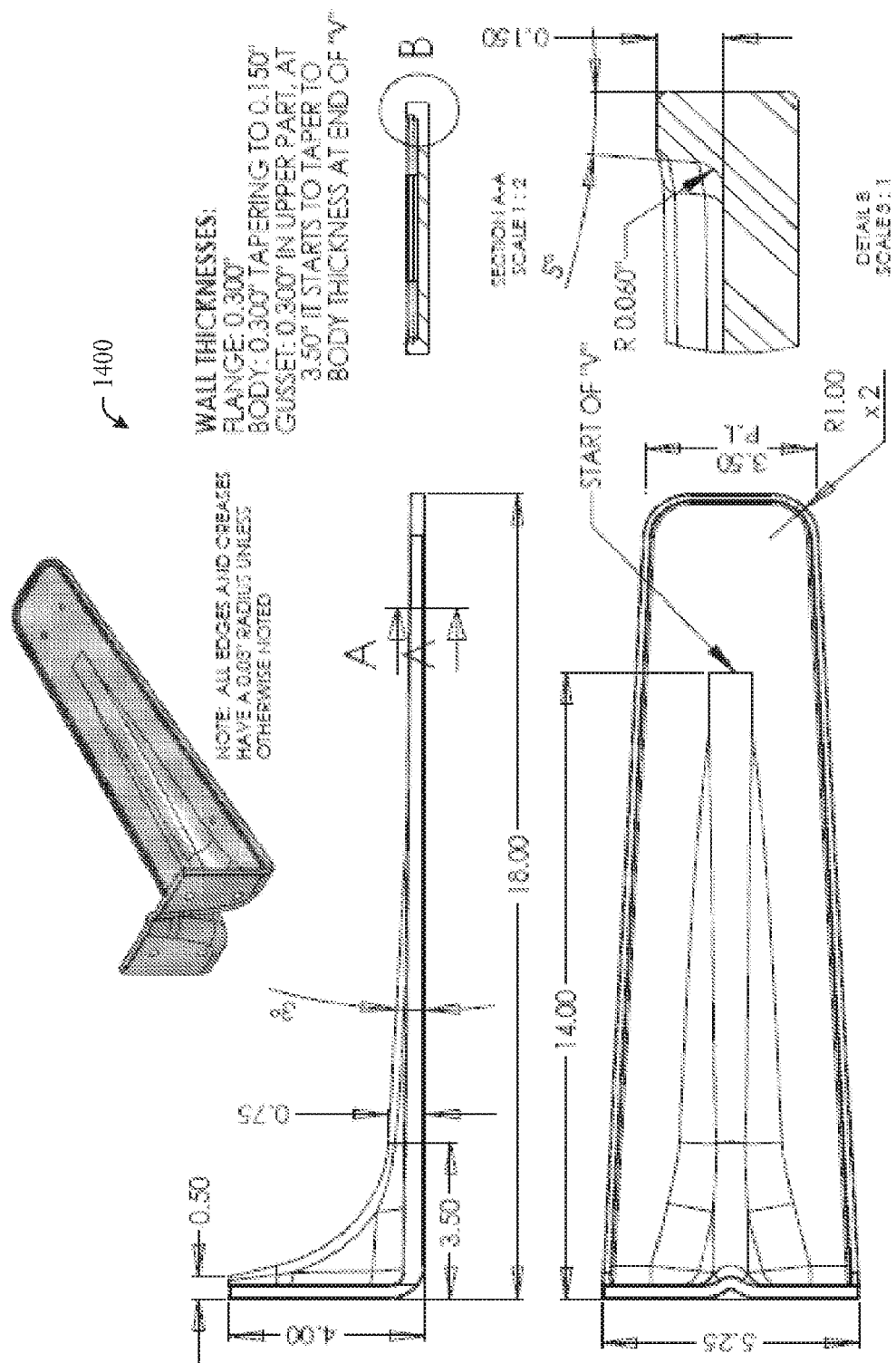
FIG. 14 illustrates an example v-brace in accordance with aspects of the innovation.
Figure 15:
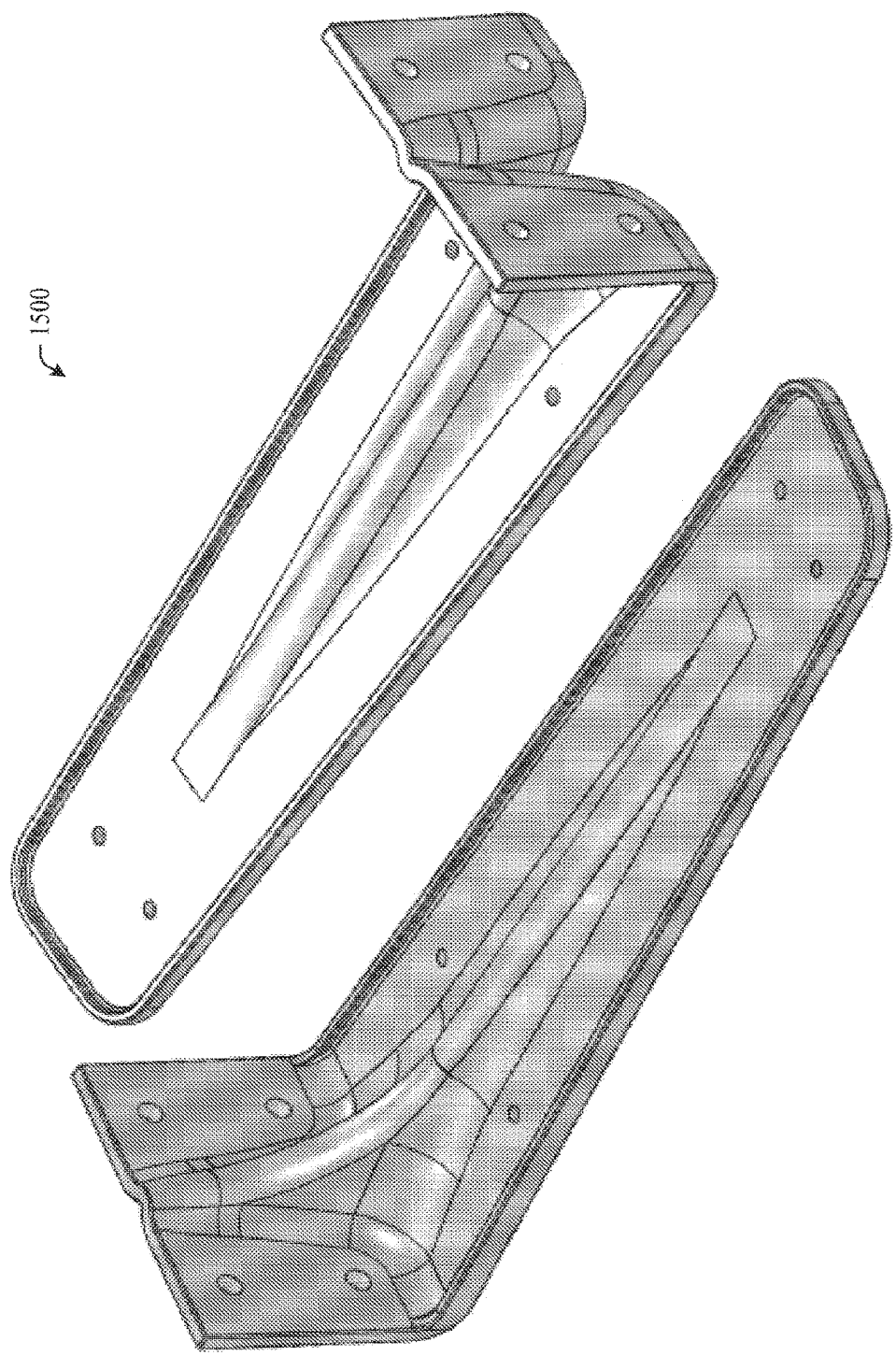
FIG. 15 illustrates an example v-brace in accordance with aspects of the innovation.

FIGS. 14 and 15 illustrate example v-brace designs (1400, 1500) in accordance with aspects of the innovation. It is to be understood that these designs are provided to add perspective to the innovation and not to limit its scope in any manner. In other words, it is to be understood that the innovation can employ v-brace- or v-wing-like braces that deviate from the exact configurations shown and described herein. However, these deviations and alternatives are to be included within the scope of the specification and claims appended hereto. For instance, while the v-brace of FIG. 15 is essentially symmetric about a center rib-like support, other aspects exist that vary in shape while being functionally equivalent or similar to those described herein. These alternatives are to be included within the scope of the disclosure and claims appended hereto.

Referring now to FIGS. 16-23, an example clamping system is shown. As described above, the bracing and supporting mechanisms (e.g., v-brace, rib, etc.) are wholly maintained within the skirt face. In operation, a clamping assembly (e.g., 1600) can be employed to attach the skirt to the underside of a trailer. More particularly, while most any clamping mechanisms can be employed to attach the skirt assemblies described here to the trailer, the following clamping design is engineered so as to avoid, alleviate or otherwise eliminate slippage or other movement of a skirt following installation. It will be understood that one problem of conventional designs is that skirt assemblies tend to slip and move post-installation, e.g., caused by air flow pressure, contact with foreign objects, vibration, etc. Here, this unique clamping design can alleviate these issues.

Figure 16:
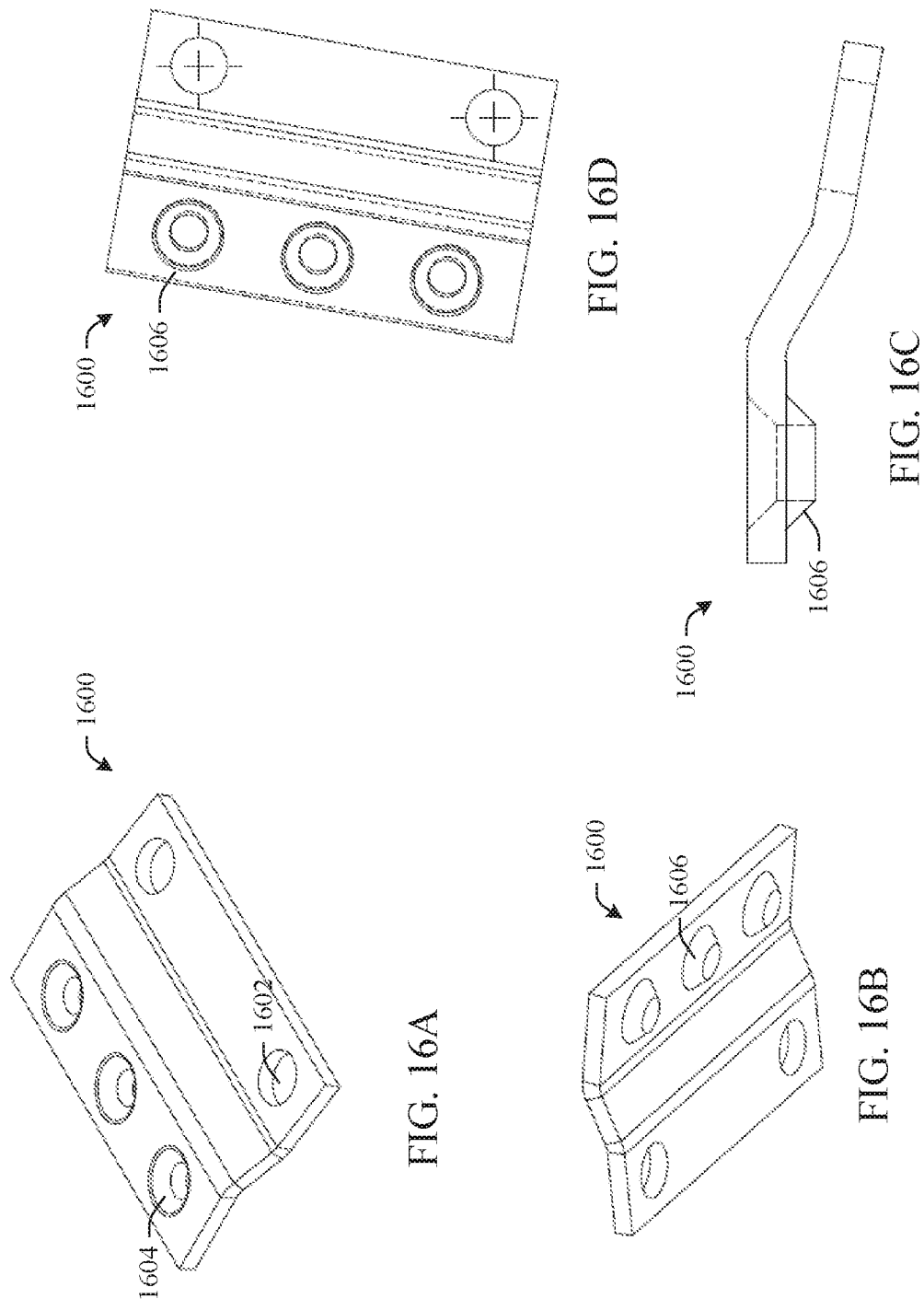
FIGS. 16A-D illustrate various views of an example anti-skid clamp assembly in accordance with aspect.

With reference to FIG. 16, a top view of a clamp 1600 is shown, in the upper left image. As will be understood upon a review of the figures that follow, the clamp 1600 can be equipped with "anti-slip" treatments so as to effect maintaining position once installed, for example, upon an I-beam or cross-member of a trailer. In a v-brace embodiment, the clamp 1600 can be equipped with holes or apertures 1602 that effect connection to the upper flange of a skirt panel or alternatively, to the v-brace. In a standard installation, two clamps 1600 are employed, one on either side of the trailer beam. The installation will be better understood upon a review of the figures discussed infra.

As shown on the top side of clamp 1600, multiple holes 1604 can be countersunk into the clamp material (e.g., metal, alloy). Continuing clockwise, the lower left image of clamp 1600 illustrates the underside of the countersink 1606. Here, the protruding countersink can effectively "grip" the beam when installed. The lower right image illustrates a side-perspective view of claim 1600. Here, it can be appreciated that the countersink treatment can be employed to grip or otherwise secure or "bite into" the beam's coating. The top right image is a bottom view of claim 1600 which illustrates the countersink treatment.

While three counter sink holes and two mounting holes are shown, it is to be understood that this configuration is merely an example. Other orientations and configurations can be employed that maintain the features, functions and benefits of the innovation. Similarly, while countersinking is employed for its performance and ease of manufacturing, it is to be appreciated that other aspects can be configured with friction treatments such as grooves, teeth, patterns, etchings, indentations, protrusions, knurled surfaces or the like. These alternatives are to be included within the scope of this disclosure and claims appended hereto.

Figure 17:
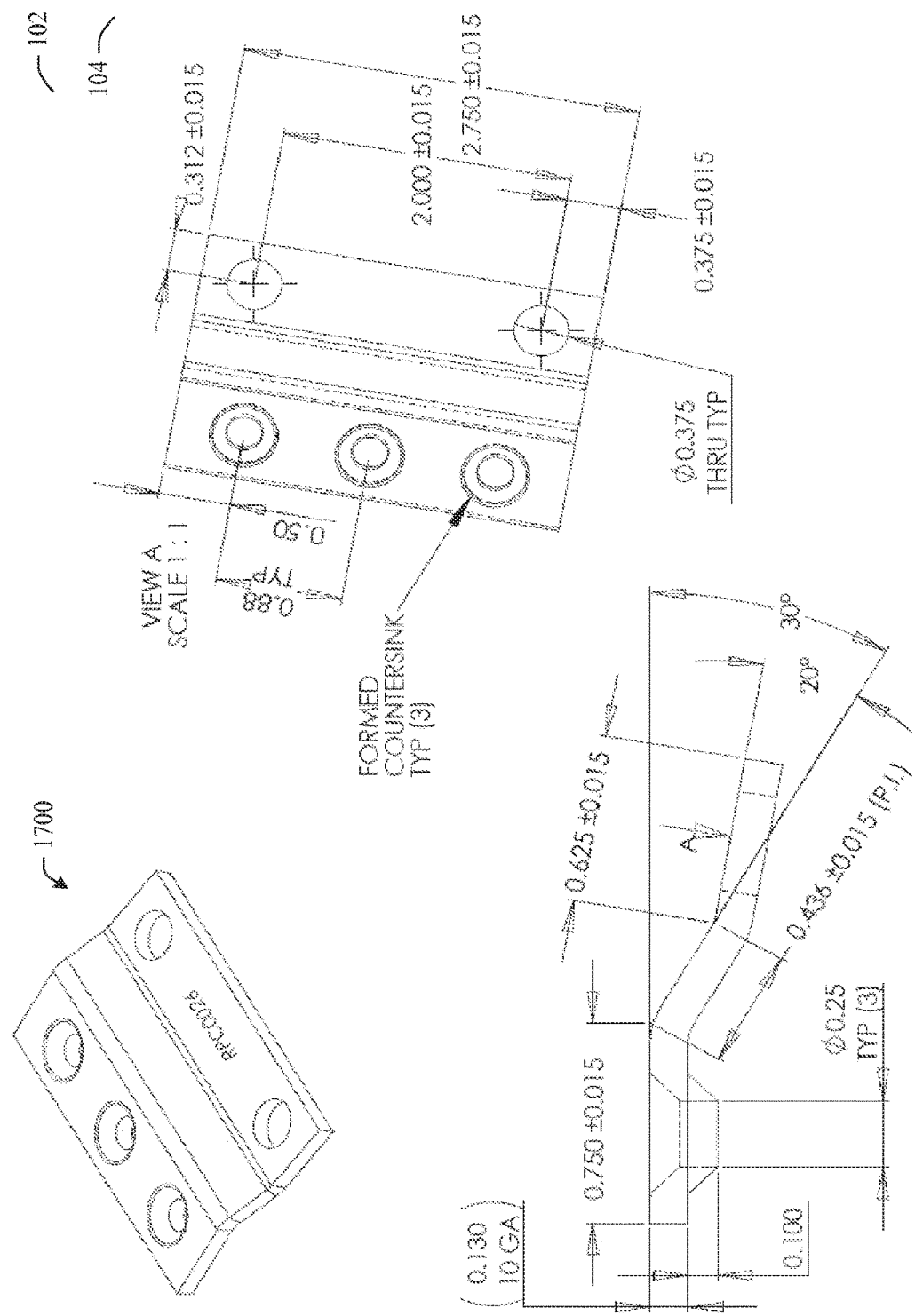
FIG. 17 illustrates an example embodiment of an anti-skid clamp assembly in accordance with aspects of the innovation.

FIG. 17 is provided to add perspective the innovation and not to limit its scope in any manner. Rather, the claim 1700 of FIG. 17 illustrates example sizes, configurations, etc. of an embodiment in accordance with the innovation. Here, the clamp has a 10 GA (0.130 inch) thickness, an overall length of approximately 2.750 inches, two mounting holes at a centerline of approximately 2.00 inches and three formed countersunk holes having a centerline of 0.88 inches between each other.

Figure 18:
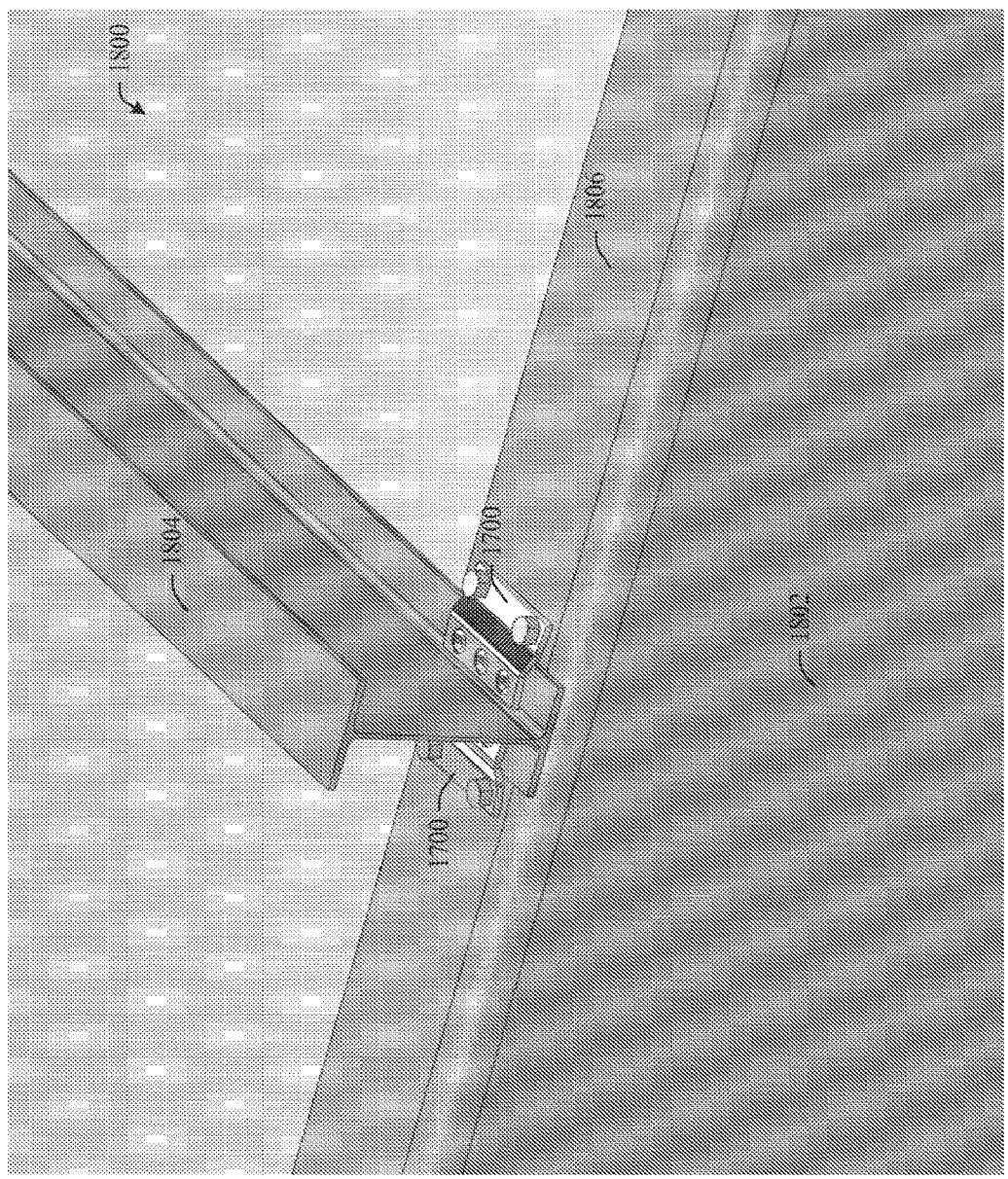
FIG. 18 illustrates an example skirt assembly in accordance with the anti-skid clamp assembly of the innovation.

FIG. 18 illustrates an example installation of a skirt assembly 1802 in accordance with the innovation. Here, two clamps 1700 (or 1600) can be employed on opposite sides of an I-beam or cross-member 1804 of a trailer. In operation, a first clamp 1700 is mounted to the top face of upper flange 1806 as shown. A second clamp 1700 is mounted to the top flange 1806 on the opposite side of vertical of the I-beam 1804 as shown. In a particular installation, the clamps 1700 can be mounted through the top flange 1806 and into a v-brace (or other bracing means) as described herein. Alternatively, it is to be understood that a structurally suitable plate (e.g., metal) can be applied to the underside of the flange 1806 so as to provide installation rigidity for the skirt panel 1802.

With continued reference to FIG. 18, as shown, the row of three countersinks can provide a "bite" or attachment to the I-beam so as to alleviate slippage or other movement. It will be appreciated that, oftentimes, the I-beams are equipped with a coating atop the metal of the beam. Here, the countersinks can essentially "bite" into the coating thereby providing a securing enhancement to the skirt upon the beam.

Figure 19:
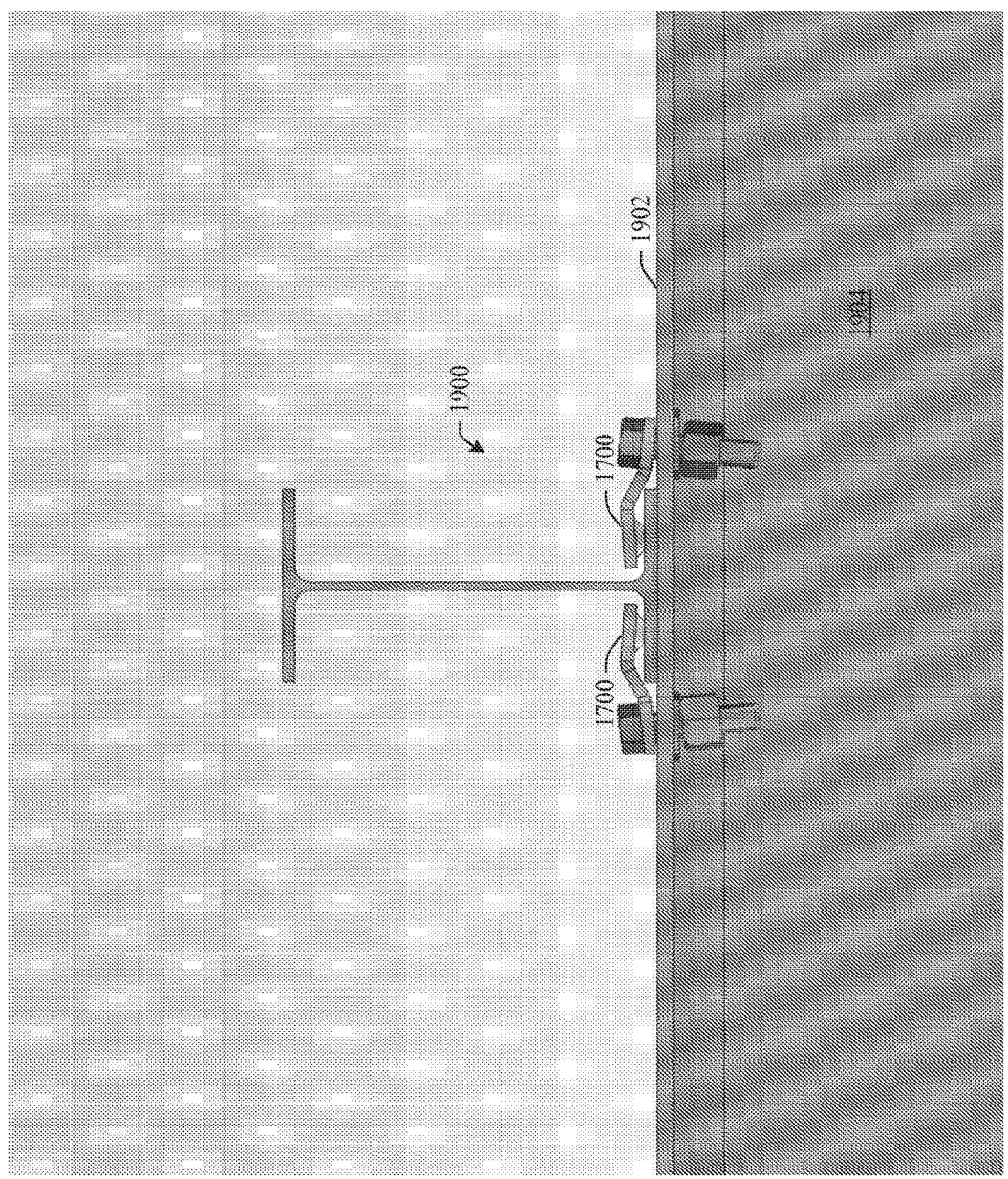
FIG. 19 illustrates an example front view of an anti-skid clamping assembly in accordance with the innovation.

FIG. 19 illustrates a front view of a clamping system 1900 in accordance with aspects of the innovation. Here, two clamps 1700 can be bolted into the top flange 1902 of skirt assembly 1904. Here, the clamps 1700 are bolted directly into the flange 1902 having standard hardware washers to provide support and integrity on the underside of the flange 1902. As shown, the countersinks can establish friction or otherwise "bite" into the I-beam thereby enhancing integrity of the skirt assembly installation. While a specific "I-beam" installation is shown, it is to be understood that alternative installations can employ the friction enhancing treatments without departing from the features, functions and benefits of the innovation.

Figure 20:
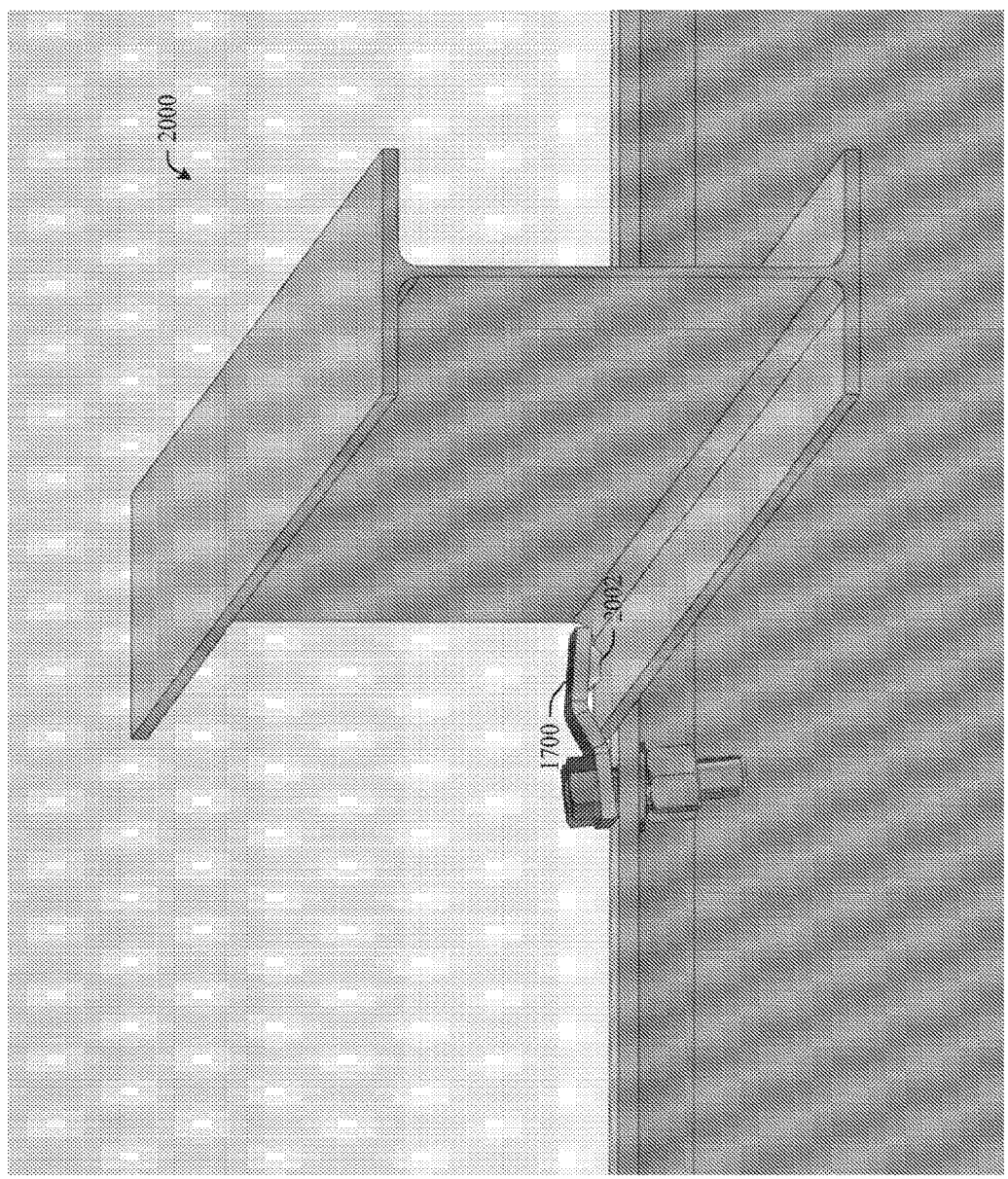
FIG. 20 illustrates an example perspective view of an anti-skid clamping assembly in accordance with aspects of the innovation.

Referring now to FIG. 20, an alternative aspect of an anti-skid clamping system 2000 is shown. As described supra, a pair of anti-skid clamps 1700 can be installed, for example, on either side of an I-beam (as shown) or cross-member. As described supra, the countersink treatment 2002 can "bite" into the metal (or coating) or otherwise enhance attachment to the beam. As described supra, while specific configurations and numbers of countersink treatments and mounting holes are shown, other aspects employ alternative arrangements without departing from the spirit and/or scope of the innovation and claims appended hereto.

While the aspects described supra and illustrated in the figures illustrate mounting the skirt assemblies flush (or in contact) with the trailer base rail, it is to be understood that, in alternative aspects, the top flange may or may not have a gap between the top of the flange and the base rail. In these aspects, the small gap may facilitate inspection of the trailer's structural cross-members. Additionally, adapters, spacers or spacer blocks may be included to accommodate cross-members of differing heights to help facilitate assembly for unique cross-member layouts. These alternative aspects are to be included within the scope of the invention described and claimed herein.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications, permutations and variations that fall within the spirit and scope of the specification and appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates bracing a skirt panel for aerodynamics, comprising:
   a brace that provides structural support to the skirt panel, comprising:
      a vertical portion with a height at least half of the height of the skirt panel and positioned within and in contact with a vertically-oriented interior surface of the skirt panel; and
   a connection mechanism that attaches the skirt panel to a trailer, such that the brace is attached within the interior surface of the skirt and is not in direct contact with the trailer.

2. The system of claim 1, wherein the brace is a resin brace.

3. The system of claim 2, wherein the brace is capable of flexing under a force and substantially regaining an original shape upon alleviation of the force.

4. The system of claim 1, wherein the brace is an integral 'rib' molded into the skirt panel.

5. The system of claim 1, wherein the brace is an angled brace having an angle of approximately a 90 degrees between the vertical portion and a horizontal portion, wherein the angled brace is wholly positioned within an interior area of the skirt panel defined by the vertically-oriented interior surface of the skirt panel and a horizontal mounting flange of the skirt.

6. The system of claim 1, wherein the skirt panel is a resilient skirt panel and is configured in a straight orientation substantially in-plane with a sidewall of the trailer.

7. The system of claim 1, wherein the skirt panel is a resilient skirt panel configured in a straight-angled orientation, wherein a rear portion of the skirt panel is substantially in-plane with a sidewall of the trailer and a forward portion of the skirt angles to a landing gear portion of the trailer.

8. The system of claim 1, wherein the skirt panel is a resilient skirt panel that comprises a curve between a rear portion and a forward portion of the skirt panel, wherein the forward portion curves inward toward a landing gear portion of the trailer and wherein the rear portion is substantially in-plane with a sidewall of the trailer.

9. The system of claim 1, further comprising a plurality of spacers that at least one of separates the skirt panel from the trailer or adapts one or more heights of a base rail or cross member to accommodate installation of the skirt panel.

10. A trailer skirt assembly, comprising:
   a resilient skirt panel;
   a resilient bracing system that supports the skirt panel, the resilient bracing system includes,
   a resilient brace having an angled configuration comprising a vertical portion that measures at least half of an interior width of the resilient skirt panel and a horizontal portion, wherein the vertical portion and the horizontal portion have an angle of approximately 90 degrees therebetween, and wherein the resilient bracing system includes an angled brace positioned completely within and entirely in contact with an interior surface of the skirt panel.

11. The trailer skirt assembly of claim 10, wherein the resilient brace capable of flexing upon contact with a foreign object and substantially regaining an original shape upon alleviation of the contact.

12. The trailer skirt assembly of claim 10, wherein the resilient brace is molded into the skirt panel.

13. A method of installing a skirt panel assembly to a trailer, comprising:
   positioning a skirt panel adjacent to an underside of the trailer in a predetermined configuration;
   mounting a brace upon an interior surface of the skirt panel, the interior surface having a vertical interior surface, the brace comprises,
      a vertical portion that extends beyond a centerline of the vertical interior surface of skirt panel and is in physical contact with the vertical interior surface of the skirt panel; and
      a horizontal portion that facilitates attachment to the trailer; and
   attaching the brace wholly within the interior surface of the skirt wherein, the vertical portion and the horizontal portion are not in direct contact with the trailer.

14. The method of claim 13, wherein the brace is a resilient resin brace having an angle of approximately 90 degrees between the vertical portion and a horizontal portion.

* * * * *